(12) United States Patent
Nagaraja et al.

(10) Patent No.: US 10,575,307 B2
(45) Date of Patent: Feb. 25, 2020

(54) RESTRICTED SET INDICATION IN MULTI-BEAM OPERATION

(71) Applicant: QUALCOMM Incorporated, San Diego, CA (US)

(72) Inventors: Sumeeth Nagaraja, San Diego, CA (US); Tao Luo, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/787,528

(22) Filed: Oct. 18, 2017

(65) Prior Publication Data

US 2018/0249453 A1 Aug. 30, 2018

Related U.S. Application Data

(60) Provisional application No. 62/463,486, filed on Feb. 24, 2017, provisional application No. 62/463,327, filed on Feb. 24, 2017.

(51) Int. Cl.
*H04W 72/04* (2009.01)
*H04W 36/00* (2009.01)
*H04W 72/08* (2009.01)

(52) U.S. Cl.
CPC ..... *H04W 72/046* (2013.01); *H04W 36/0072* (2013.01); *H04W 36/0094* (2013.01); *H04W 72/085* (2013.01)

(58) Field of Classification Search
CPC ......... H04W 72/1252; H04W 72/0413; H04W 74/0833; H04W 72/046; H04W 24/02;
(Continued)

(56) References Cited

U.S. PATENT DOCUMENTS

| 6,731,907 B1 * | 5/2004 | Seon | H04W 48/06 455/67.11 |
| 2005/0070285 A1 * | 3/2005 | Goransson | H04W 36/30 455/436 |

(Continued)

FOREIGN PATENT DOCUMENTS

WO 2017068547 A1 4/2017

OTHER PUBLICATIONS

Partial International Search Report—PCT/US2018/015280—ISA/EPO—dated May 23, 2018
(Continued)

*Primary Examiner* — Julio R Perez
(74) *Attorney, Agent, or Firm* — Arent Fox, LLP

(57) ABSTRACT

In multi-beam operation, path losses or other aspects of electromagnetic signal propagation, may make it necessary to restrict certain beam directions used between two devices. A base station determines a restricted-beam set including at least one beam direction that is restricted for at least one of a signal transmission or a signal reception. The base station also restricts at least one of a transmission or a reception of a signal based on the restricted-beam set. Additionally, the base station determines an updated restricted-beam set including at least one beam direction that is restricted for at least one of transmission or reception of an electromagnetic signal. The base station also updates the restricted-beam set by adding or removing at least one beam direction to the restricted set corresponding to at least one of signal transmission or signal reception.

30 Claims, 21 Drawing Sheets

(58) Field of Classification Search
CPC ......... H04W 36/0072; H04W 36/0094; H04W 36/24; H04W 48/20; H04W 72/042; H04W 72/085; H04L 5/005; H04L 5/0051; H04L 5/0023; H04B 7/0617; H04B 7/0626; H04B 7/0632; H04B 7/0634; H04B 7/0639; H04B 7/0695; H04B 7/088
See application file for complete search history.

(56) References Cited

U.S. PATENT DOCUMENTS

| | | | | |
|---|---|---|---|---|
| 2007/0285312 | A1* | 12/2007 | Gao | H01Q 1/246 |
| | | | | 342/367 |
| 2014/0146782 | A1* | 5/2014 | Gerlach | H04W 72/0426 |
| | | | | 370/329 |
| 2015/0372737 | A1* | 12/2015 | Park | H04W 16/28 |
| | | | | 370/329 |
| 2016/0183233 | A1* | 6/2016 | Park | H04W 16/30 |
| | | | | 370/331 |
| 2016/0192401 | A1* | 6/2016 | Park | H04W 74/0833 |
| | | | | 370/329 |
| 2016/0323029 | A1* | 11/2016 | Cheng | H04B 7/0626 |
| 2018/0123672 | A1* | 5/2018 | Baker | H04B 7/0641 |

OTHER PUBLICATIONS

International Search Report and Written Opinion—PCT/US2018/015280—ISA/EPO—dated Jul. 17, 2018.

\* cited by examiner

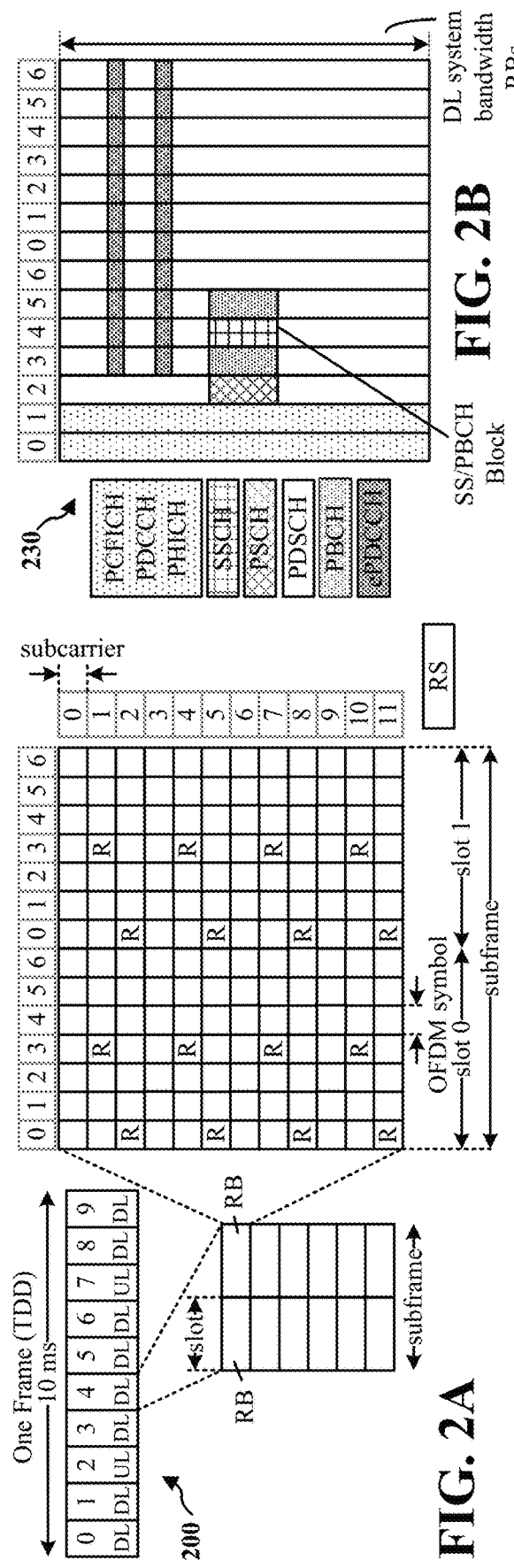
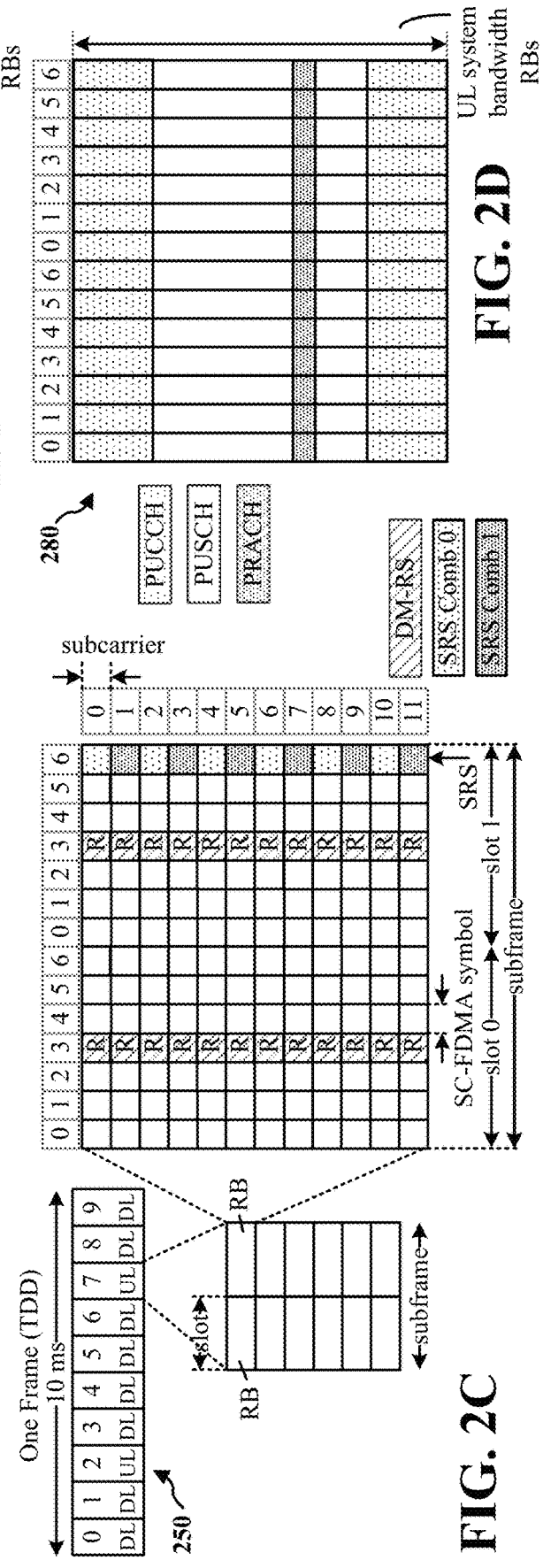
FIG. 2A  FIG. 2B  FIG. 2C  FIG. 2D

RESTRICTED SET INDICATION IN MULTI-BEAM OPERATION

CROSS-REFERENCE TO RELATED APPLICATION(S)

This application claims the benefit of U.S. Provisional Application Ser. No. 62/463,486, entitled "RESTRICTED SET INDICATION IN MULTI-BEAM OPERATION" and filed on Feb. 24, 2017 and U.S. Provisional Application Ser. No. 62/463,327, entitled "TECHNIQUES AND APPARATUSES FOR HANDOVER AND RADIO LINK FAILURE BASED AT LEAST IN PART ON A RESTRICTED SET" and filed on Feb. 24, 2017, each of which is expressly incorporated by reference herein in its entirety.

BACKGROUND

Field

The present disclosure relates generally to communication systems, and more particularly, to restricted sets for multi-beam operation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In multi-beam operation, path losses or other aspects of electromagnetic signal propagation may make it necessary to restrict certain beam directions used between two devices. Beam direction restrictions for one device may not lie to beam restrictions for the other device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, in multi-beam operation, path losses or other aspects of electromagnetic signal propagation, may make it necessary to restrict certain beam directions used between two devices. Beam direction restrictions for one device may not lie along the same bath as beam restrictions for the other device. Accordingly, (1) beam direction restrictions may not have beam correspondence on uplink (UL) and downlink (DL), (2) an imbalance may exist between UL and DL, and (3) certain limitations may make it necessary to restrict a UE or base station from communicating in certain beam directions.

Accordingly, some aspects described herein may relate to a restricted-beam set including a list or set of restricted directions. The restricted directions may form a set of restricted-beam direction. Furthermore, in some examples, the systems and methods described herein may relate to one or more of (1) configuring a restricted-beam set, (2) reporting the restricted-beam set, (3) managing the restricted-beam set, or some combination of configuring a restricted-beam set, reporting the restricted-beam set, or managing the restricted-beam set.

In an aspect of the disclosure, a method, a computer-readable medium, and an apparatus are provided. The apparatus may be a base station. The base station determines a restricted-beam set including at least one beam direction that is restricted for at least one of a signal transmission or a signal reception. The base station also restricts at least one of a transmission or a reception of a signal based on the restricted-beam set. Additionally, the base station determines an updated restricted-beam set including at least one beam direction that is restricted for at least one of transmission or reception of an electromagnetic signal. The base station also updates the restricted-beam set by adding at least one beam direction to the restricted set or removing at least one beam direction from the restricted set corresponding to at least one of signal transmission or signal reception.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
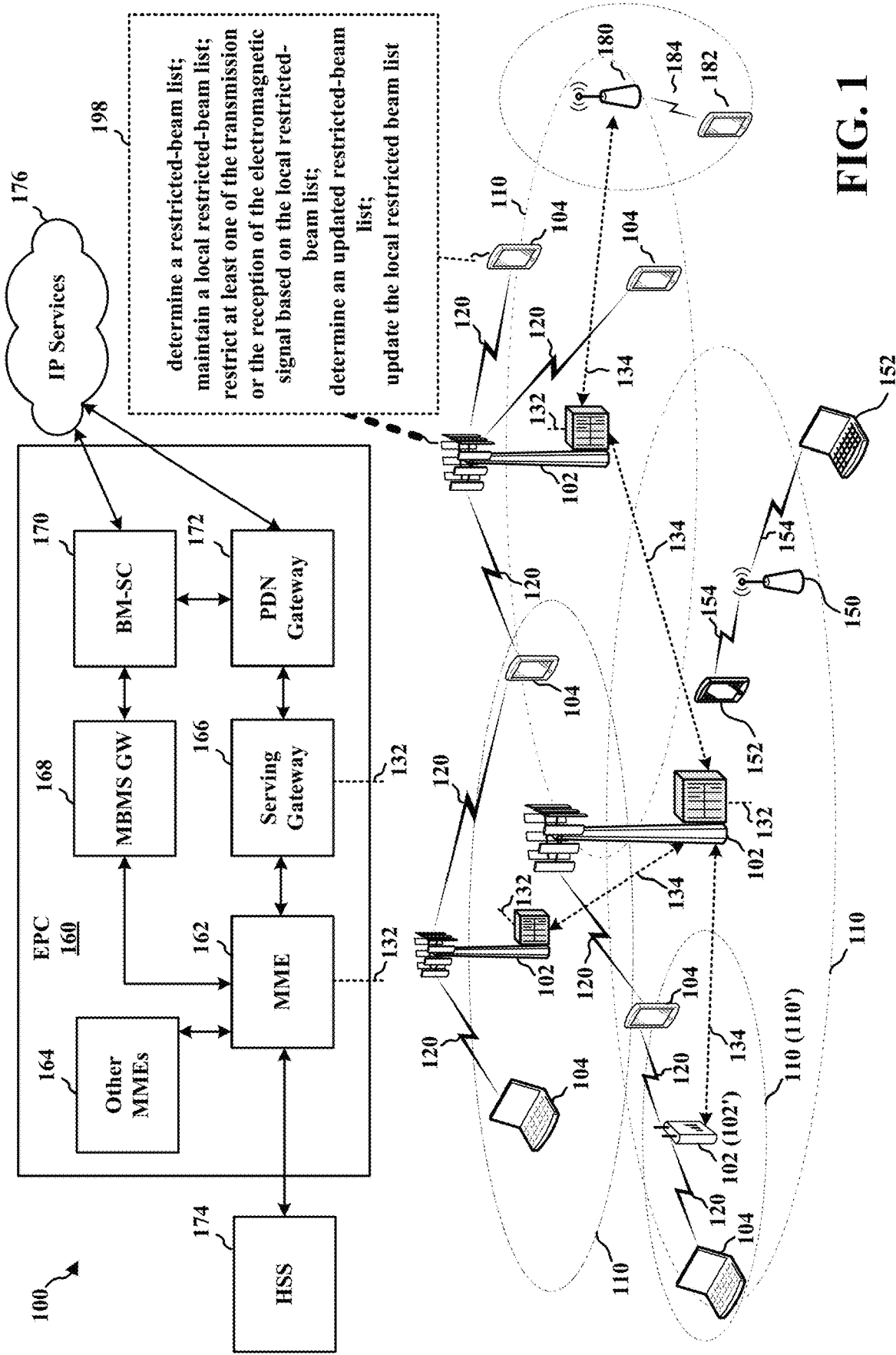
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to, and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB/gNB 102 or the UE 104 may be configured to determine a restricted-beam set including at least one beam direction that is restricted for at least one of a transmission or a reception of an electromagnetic signal. Additionally, the eNB/gNB 102 or the UE 104 may be configured to maintain a restricted-beam set based on the determined restricted-beam set. The eNB/gNB 102 or the UE 104 may also be configured to restrict at least one of the transmission or the reception of the electromagnetic signal based on the restricted-beam set. Additionally, the eNB/gNB 102 or the UE 104 may be configured to determine an updated restricted-beam set including at least one beam direction that is restricted for at least one of transmission or reception of an electromagnetic signal. The eNB/gNB 102 or the UE 104 may be configured to update the restricted-beam set based on the determined updated restricted-beam set (198). (The eNB/gNB 102 may generally perform the operations discussed with respect to 198.)

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
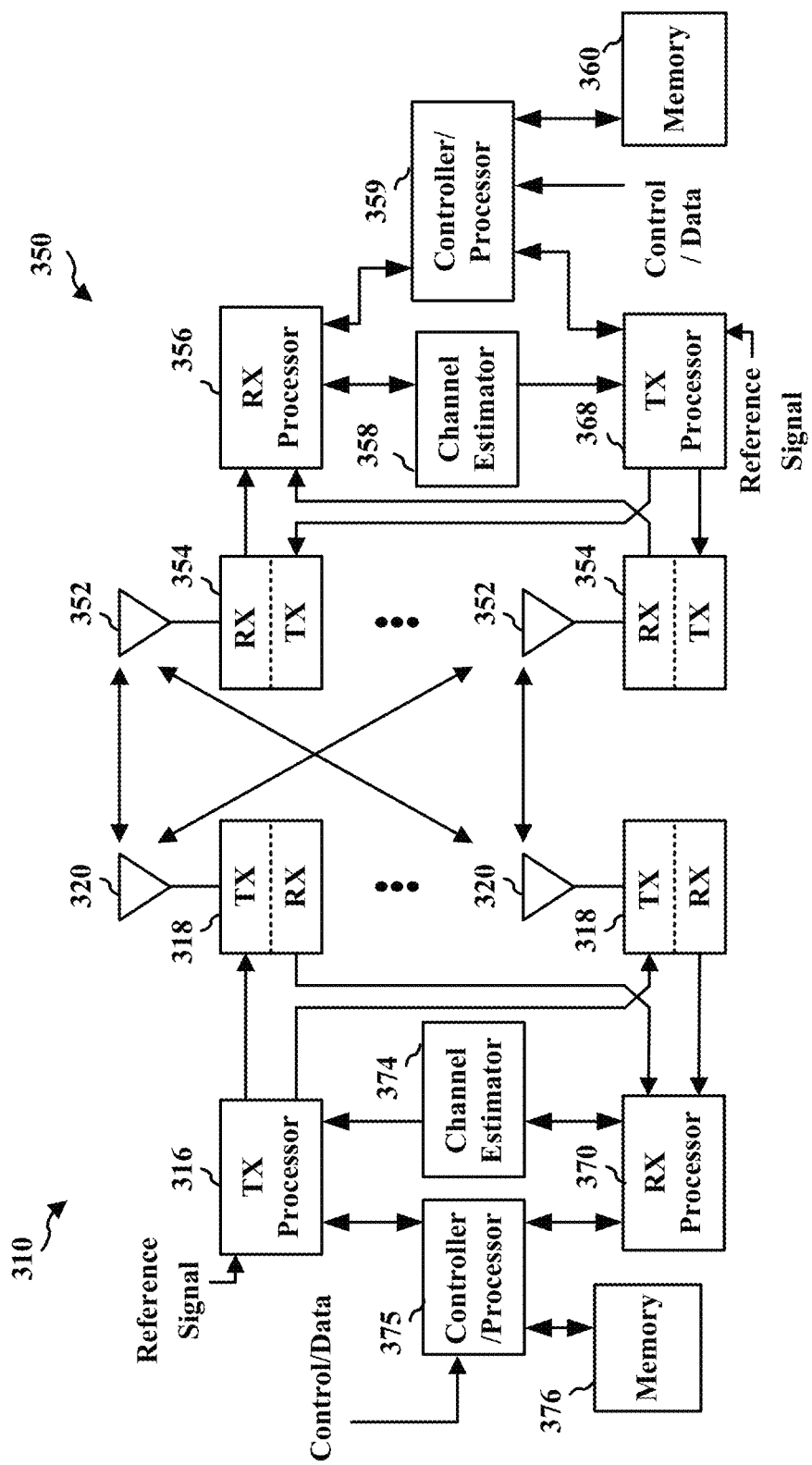
FIG. 3 is a diagram illustrating an example of a base station and user equipment (UE) in an access network.

FIG. 3 is a block diagram of an base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal-processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIGS. 4A through 4G are diagrams illustrating an example of the transmission of beamformed signals between a base station and a UE. The base station 402 may be embodied as a base station in a mmW system (e.g., mmW base station), such as a gNB or the base station 180. In one aspect, the base station 402 may be collocated with another base station, such as an eNB/gNB, a cellular base station, or other base station (e.g., a base station configured to communicate in a sub-6 GHz band). While some beams are illustrated as adjacent to one another, such an arrangement may be different in different aspects (e.g., beams transmitted during a same symbol may not be adjacent to one another). Additionally, the number of illustrated beams is to be regarded as illustrative.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near-mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the base stations and the UEs transmit and receive in a direction that allows the most RF energy to be collected.

The base station 402 may include hardware for performing analog and/or digital beamforming. For example, the base station 402 may transmit a time synchronization signal (TSS). The TSS may be utilized in connection with beamforming. The TSS may include a block index. The block index may be decoded and used to determine a beam direction. If the base station 402 is equipped with analog beamforming, at any one time, the base station 402 may transmit or receive a signal in only one direction. If the base station 402 is equipped with digital beamforming, the base station 402 may concurrently transmit multiple signals in multiple directions or may receive multiple signals concurrently in multiple directions.

Further, the UE 404, for example, may include hardware for performing analog and/or digital beamforming. If the UE 404 is equipped with analog beamforming, at any one time, the UE 404 may transmit or receive a signal in only one direction. If the UE 404 is equipped with digital beamforming, the UE 404 may concurrently transmit multiple signals in multiple directions or may concurrently receive multiple signals in multiple directions.

The systems and methods described herein may generally apply to multi-beam operation of, for example, wireless communication devices, including, but not limited to wireless communication devices operating on mmW networks. In a specific example, for multi-beam operation of UEs operating in mmW frequency range, the UEs may perform beam sweeps with mmW base stations within range. For example, the base station 402 may transmit m beams in a plurality of different spatial directions. The UE 404 may listen/scan for the beam transmissions from the base station 402 in n different receive spatial directions. When listening/scanning for the beam transmissions, the UE 404 may listen/scan for the beam sweep transmission from the base station 402 m times in each of the n different receive spatial directions (a total of m*n scans). In another aspect, in a beam sweep, the UE 404 may transmit n beams in a plurality of different spatial directions. The base station 402 listens/scans for the beam transmissions from the UE 404 in m different receive spatial directions. When listening/scanning for the beam transmissions, the base station 402 may listen/scan for the beam sweep transmission from the UE 404 n times in each of the m different receive spatial directions (a total of m*n scans).

Based on the performed beam sweeps, the UEs and/or the base stations may determine a channel quality associated with the performed beam sweeps. For example, the UE 404 may determine the channel quality associated with the performed beam sweeps. Alternatively, the base station 402 may determine the channel quality associated with the performed beam sweeps. If the UE 404 determines a channel quality associated with the performed beam sweeps, the UE 404 may send the channel quality information (also referred to as beam sweep result information) to the base station 402. The UE 404 may send the beam sweep result information to the base station 402. If the base station 402 determines a channel quality associated with the performed beam sweeps, the base station 402 may send the beam sweep result information to the UE 404. In an aspect, the channel quality may be affected by a variety of factors. The factors include movement of the UE 404 along a path or due to rotation (e.g., a user holding and/or rotating the UE 404), movement along a path behind obstacles, and/or movement within particular environmental conditions (e.g., obstacles, rain, humidity). The UE 404 and the base station 402 may also exchange other information, for example, associated with for beamforming (e.g., analog or digital beamforming capabilities, beamforming type, timing information, configuration information, etc.).

Based on the received information, the base station 402 and/or the UE 404 may determine various configuration information, such as network access configuration information, information for adjusting beam sweeping periodicity, information regarding overlapping coverage for predicting a handoff to another base station, such as a base station.

Figure 4B:
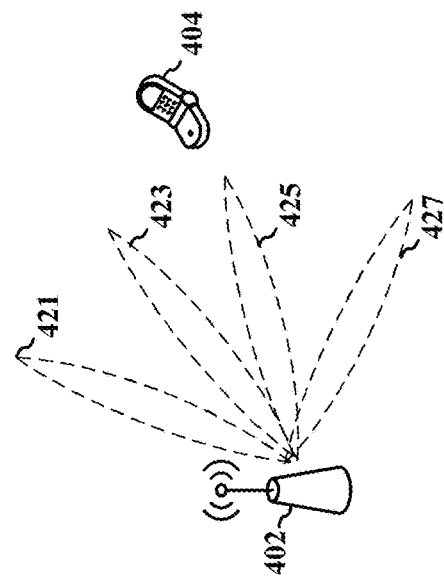
FIGS. 4A through 4G are diagrams illustrating an example of the transmission of beamformed signals between a base station and a UE.

In an aspect, a beam set may contain eight different beams. For example, FIG. 4A illustrates eight beams 421, 422, 423, 424, 425, 426, 427, 428 for eight directions. In aspects, the base station 402 may be configured to beamform for transmission of at least one of the beams 421, 422, 423, 424, 425, 426, 427, 428 toward the UE 404. In one aspect, the base station 402 may sweep/transmit directions using eight ports during a slot (e.g., synchronization signal).

In an aspect, a base station may transmit a signal, such as a beam reference signal (BRS), in a plurality of directions, for example, during a synchronization signal. In one aspect, this transmission may be cell-specific. Referring to FIG. 4B, the base station 402 may transmit a first set of beams 421, 423, 425, 427 in four directions. For example, the base station 402 may transmit a BRS in a synchronization signal of each of the transmit beams 421, 423, 425, 427. For example, the synchronization signal may be a TSS. The TSS may provide a block index. The block index may be used to determine a beam direction.

In an aspect, these beams 421, 423, 425, 427 transmitted in the four directions may be odd-indexed beams 421, 423, 425, 427 for the four directions out of a possible eight for the beam set. For example, the base station 402 may be capable of transmitting beams 421, 423, 425, 427 in directions adjacent to other beams 422, 424, 426, 428 that the base station 402 is configured to transmit. In an aspect, this configuration in which the base station 402 transmits beams 421, 423, 425, 427 for the four directions may be considered a "coarse" beam set.

The UE 404 may determine a respective beam index (sometimes abbreviated as "BI") corresponding to a respective beam. In various aspects, the beam index may be indicate at least a direction for communicating through a corresponding beam toward the UE 404 (e.g., a beamforming direction). For example, the beam index may be a logical beam index associated with an antenna port, OFDM symbol index, and/or NR-SS transmission period, which may be indicated by one or more bits (e.g., 9 bits). For example, the UE 404 may be configured to determine a beam index corresponding to a beam based on a time at which a NR-SS is received—e.g., a symbol or slot during which a NR-SS is received may indicate a beam index corresponding to a beam.

Figure 4D:
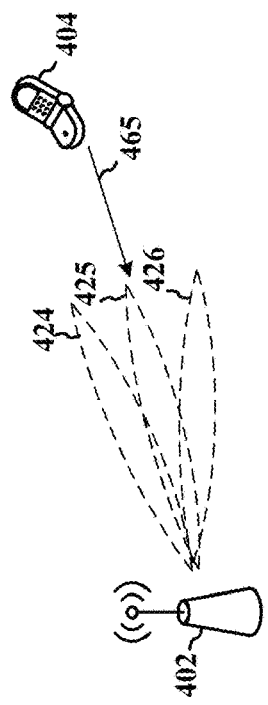
Figure 4A:
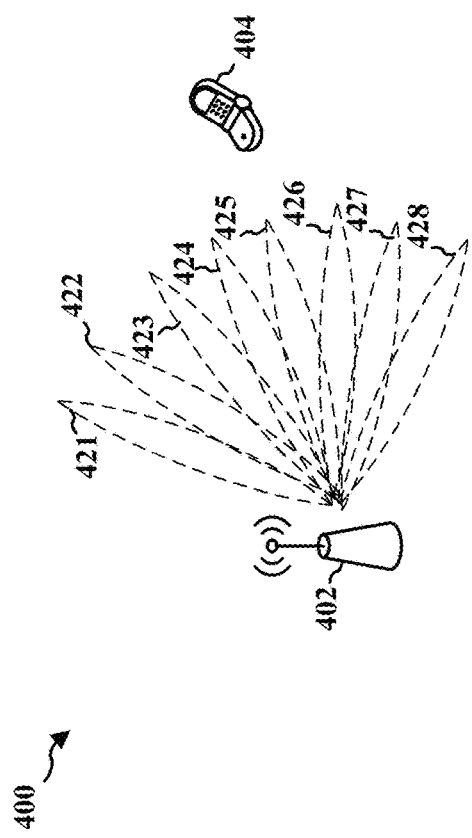
Figure 4C:
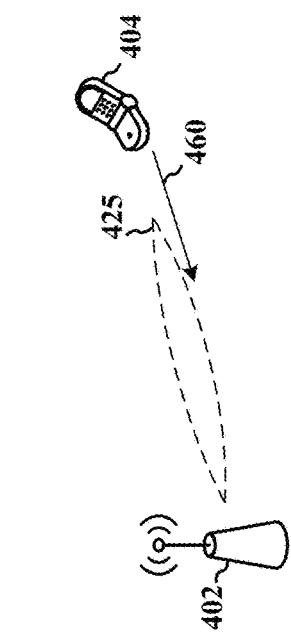

In FIG. 4C, the UE 404 may determine or select a beam index (sometimes abbreviated as "BI") that is strongest or preferable. In one example, the UE 404 may determine a beam index from a TSS. The TSS may provide a beam index that may be used to determine a beam direction. In another example, the UE 404 may determine that the beam 425 carrying a NR-SS is strongest or preferable. The UE 404 may select a beam by measuring values for a received power or received quality associated with each of the first set of beams 421, 423, 425, 427. In one aspect, the received power may be referred to as a BRS received power (BRSRP).

The UE 404 may compare respective values to one another. The UE 404 may select a "best" beam. In an aspect, the best beam may be a beam that corresponds to the greatest or highest value (e.g., the best beam may be a beam with the highest BRSRP). The selected beam may correspond to a beam index, which may be a beam index with respect to the base station 402. For example, the UE 404 may determine that the BRSRP corresponding to the fifth beam 425 is the highest, and therefore the fifth beam 425 is the best beam as determined by the UE 404.

The UE 404 may transmit a first indication 460 of the fifth beam 425 to the base station 402. In an aspect, the first indication 460 may include a request to transmit a CSI-RS. The CSI-RS may be UE-specific. One of ordinary skill would appreciate that the CSI-RS may be referred to by different terminology without departing from the present disclosure, such as a beam refinement signal, a beam tracking signal, or another term.

In one aspect, the base station 402 may trigger transmission of the first indication 460. For example, the base station 402 may trigger transmission of the first indication 460 via a DCI message.

The base station 402 may receive the first indication 460. In one aspect, the first indication 460 may include a beam adjustment request (BAR). (e.g., a request for beam tracking, a request for a CSI-RS, a request for the base station to start transmitting on an indicated beam index without any further beam tracking, and the like). In one aspect, the first indication 460 may be indicated by a scheduling request. Based on the first indication 460, the base station 402 may determine the beam index corresponding to the fifth beam 425.

In FIG. 4D, the base station 402 may transmit a second set of beams based on the first indication 460 (e.g., based on a beam index indicated by the first indication 460). For example, the UE 404 may indicate that a fifth beam 425 is the best beam and, in response, the base station 402 may transmit a second set of beams 424, 425, 426 to the UE 404 based on the indicated beam index. In an aspect, the beams 424, 425, 426 transmitted based on the first indication 460 may be closer (e.g., spatially and/or directionally) to the fifth beam 425 than those other beams 421, 423, 427 of the first set of beams.

In an aspect, the beams 424, 425, 426 transmitted based on the first indication 460 may be considered a "fine" beam set. In an aspect, the base station 402 may transmit a CSI-RS through each of the beams 424, 425, 426 of the fine beam set. In an aspect, the beams 424, 425, 426 of the fine beam set may be adjacent. In an aspect, CSI-RS transmission can span 1, 2, 5, or 10 OFDM symbols and may be associated with a CSI-RS resource allocation, CSI-RS process indication, and/or a beam refinement process configuration.

Based on the CSI-RS transmission through the beams 424, 425, 426 of the fine beam set, the UE 404 may transmit a second indication 465 to the base station 402 to indicate a "best" beam. In an aspect, the second indication 465 may use two (2) bits to indicate the selected beam. For example, the UE 404 may transmit the second indication 465 that indicates a beam index corresponding to the selected beam 425. In one aspect, the second indication 465 may report beam refinement information (BRI). In one aspect, the second indication 465 may include a resource index (e.g., a CSI-RS-RI) and/or a reference power (RP) associated with the reception of the CSI-RS as measured by the UE 404 (e.g., a CSI-RS-RP). The base station 402 may then communicate with the UE 404 through the selected beam 425. As described herein, knowing a beam index from a synchronization procedure, e.g., from the TSS, may be useful for beam selection.

Figure 4E:
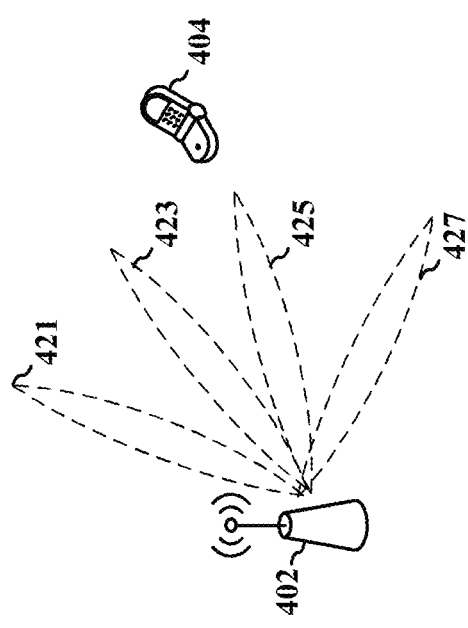

Referring to FIG. 4E, the base station 402 may transmit a NR-SS in a plurality of directions during a synchronization signal. In an aspect, the base station 402 may transmit the NR-SS continuously, e.g., even after the UE 404 has communicated the second indication 465. For example, the base station 402 may transmit beams 421, 423, 425, 427 that each include a NR-SS (e.g., a "coarse" beam set).

Figure 4G:
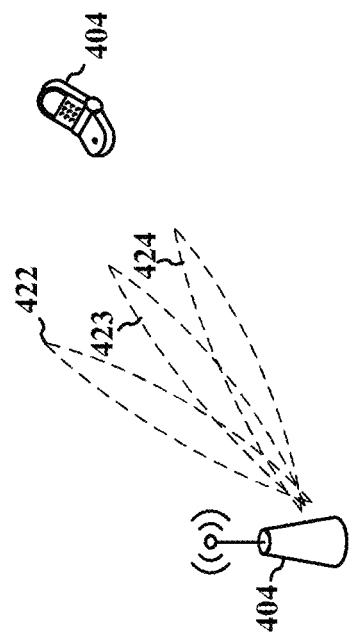
Figure 4F:
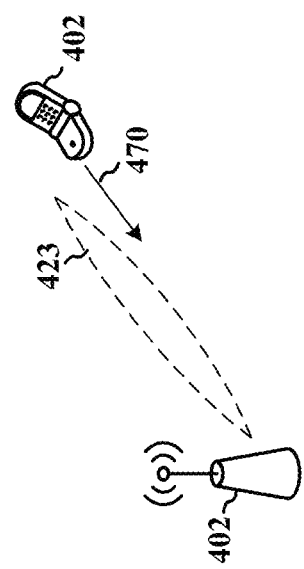

Referring to FIG. 4F, the quality of a selected beam 423 may deteriorate with respect to how signals transmitted by the base station 402 on the selected beam 423 are received at the UE 404. For example, when the base station 402 and the UE 404 are communicating through the selected beam 423, the selected beam 423 may become occluded or otherwise unsatisfactory such that the base station 402 and the UE 404 may benefit from communicating through another beam. Based on the NR-SS (e.g., transmitted during a synchronization signal), the UE 404 may determine a new beam 423 through which to communicate. For example, the UE 404 may determine that the third beam 423 through which a NR-SS is communicated may be the best beam. The UE 404 may select a beam based by measuring values for a received power (e.g., BRSRP) or received quality associated with each of the set of beams 421, 423, 425, 427, comparing respective values to one another, and selecting the beam that corresponds to the highest value. The selected beam may correspond to a beam index at the base station 402. The UE 404 may transmit a third indication 470 indicating this beam index to the base station 402. In an aspect, the third indication 470 may include a request to transmit a CSI-RS. The CSI-RS may be UE-specific. In one aspect, a BAR may be used to request the base station 402 to transmit a CSI-RS. In one aspect, the third indication 470 may be triggered by the base station 402, such as by a DCI message. Similar to the first indication 460, the third indication 470 may be included in a scheduling request.

With respect to FIG. 4G, the base station 402 may receive the third indication 470 from the UE 404. The base station 402 may be configured to determine a beam index based on at least the third indication 470. The base station 402 and the UE 404 may perform a beam refinement procedure, such as illustrated with respect to FIG. 4E (e.g., in order to select a new beam through which to communicate).

Some wireless systems may experience high path loss. Path loss is a reduction in power density of an electromagnetic wave as the electromagnetic wave propagates through space. Hybrid beam forming (analog and/or digital) may be used in wireless systems experiencing path loss. The hybrid beamforming may include beamforming methods that are not present in 3G and 4G systems. Hybrid beamforming may permit multi-beam operation for users. Beam forming (e.g., from an NB to a UE) may enhance link budget/signal-to-noise ratio (SNR). (A link budget is an accounting of all of the gains and losses from the transmitter, through the medium (free space, cable, waveguide, fiber, etc.) to the receiver in a telecommunication system.)

An example equation for link budget is:

Received Power (dB)=Transmitted Power (dB)+ Gains (dB)−Losses (dB)

A Node B (NB, e.g., eNB, gNB) and a UE may communicate over active beams, e.g., an active data channel or channels and/or an active control channel or channels. Active beams may be NB and UE beam pairs that carry data and control channels such as physical downlink shared channel (PDSCH), physical downlink control channel (PD-CCH), Physical Uplink Shared Channel (PUSCH), and Physical Uplink Control Channel (PUCCH). A pair of beams for DL transmissions may be different from a pair of beams for UL transmissions. In some cases, a device, e.g., NB or UE, may not transmit in certain directions. For example, for a UE, an antenna may be blocked by a user's hand.

Accordingly, in multi-beam operation, NB and UE active beam pairs (active transmit-receive beam pairs) may have one or more restrictions. For example, one possible restrictions may include not having beam correspondence on uplink (UL) and downlink (DL), e.g., beam correspondence may include correspondence in direction, such as 0 degrees for one device and 180 degrees for another device. Another example restriction on active beam pairs may be an imbalance in UL and DL. For example, different directions selected for UL and/or DL may have different amounts of fading and thus, for the same transmit power, different directions may not have the same received power. The active beam pairs may also have certain limitations that may restrict the UE or NB in communicating in certain beam directions, e.g., due to path losses or maximum permissible limits, or other aspects of wireless communication that may impact transmission or reception of a wireless signal in a direction. Some directions may have too much path loss to operate for UL or DL transmissions.

Accordingly, when such restrictions occur, the NB and UE cannot assume that the beam selected for DL transmission (e.g., $NB_{TX}$ to $UE_{RX}$) may be used for UL transmissions (e.g., $UE_{TX}$ to $NB_{RX}$). Further, when such restrictions occur, the UE may not be able to transmit more than a determined power level (or EIRP) as well because the corresponding uplink beam may be restricted because maximum permissible emission.

The drawbacks of one device not having another device's restricted-beam information may include beam failure. For example a transmitted beam may not be received by the intended recipient device (or any device), e.g., due to path loss. Another drawback may be radio link failure (RLF); and/or throughput/rate impact along one direction, e.g., due to path losses in that one direction (the direction of the restricted-beam). Thus the entire radio link, e.g., UL and DL may fail or the data rate for transmissions, e.g., UL or DL may be decreased base on path losses based on the beams selected. Generally beam directions that may have a high probability of beam failures or RLF, may be added to the restricted-beam set, as may beam directions that may have poor throughput or a rate impact.

In an aspect, a restricted-beam set may be generated and used when one or more beams cannot be used for Tx, Rx, or both Tx and Rx for a given device. For example, a device, such as a UE, may perform measurements to determine a restricted-beam set. A UE may transmit the restricted-beam set.

A UE may measure one or more reference signals (RS) from an base station (e.g., New Radio for Shared Spectrum (NR-SS), monitoring reference signal (MRS), channel state indication reference signal (CSI-RS), etc.) and determine one or more beam directions that is best suited for DL transmission. For example, measuring may include RSRP, RSRQ, RSSI, and/or SINR. Based on the determination a UE Rx beam may be selected. However, due to some restriction a UE may not be permitted to transmit in the same direction on the UL. Additionally, the measurements may be used to generate the restricted-beam set for the downlink. The measurements may be repeated because the restricted-beam set may change over time. For example, blockages of an antenna may occur and end, the UE may move, change orientation, change physical location, or other changes at the UE, base station, or else, where that impact transmission. Accordingly, antenna directions that may be restricted may change based on blockage changes, movements, orientation changes, changes in physical location, or other changes.

Similarly, the base station may have transmit restrictions. An base station may measure one or more RS, e.g., from UE. For example, measurements may include RSRP, RSRQ, RSSI, and/or SINR. Base station RSs may include, e.g., sounding reference signal (SRS), etc. and determine one or more beam directions that are best suited for the UL. Based on the measurements at the base station, the base station Rx beam may be selected. However, due to some restriction a base station may not be permitted to transmit in the same direction on the DL. Accordingly, circumstances for the base station and/or the UE may change over time, e.g., blockage, location, orientation, position. Accordingly, the restricted-beam set may change over time.

Reporting Restricted-Set:

After performing measurements on the DL, a UE may determine that some of the beams (UE Tx) are infeasible for UL transmission due to restrictions. A measurement report may be sent that include the following information for one or more beams:

Beam Identification (ID), beam signal quality, and restricted-beam information.

The restricted-beam information will specify if the beam can be used by the UE on the UL or not.

Some example systems may take various actions based on the restricted-beam set. For example, an base station may receive a report that has restricted-beam set information. The report may include a set or a list of restricted beam directions. The report that has restricted-beam set information may be based on measurements. For example, as described herein, the measurements may include UETX to base station RX and/or base station TX to UERX, The measurements may be based on operational transmissions (e.g., data or control transmissions) and/or reference signals. Based on the restricted-beam set information the base station may choose a different beam that does not have any restrictions (e.g., as active beam). Beams in the restricted-beam set may not be used in some examples. Additionally, based on the restricted-beam set information, when the base station chooses to use a beam that is restricted then the base station may configure RS in the direction of DL beam and RS in the direction of UL beam, the base station may transmit periodic RS to determine if the restricted-beam set changed, and the base station may configure the UE to report (event based) if the restricted-beam set changed. Thus, in some examples, restricted beams may be used so that measurements may be performed on restricted beams.

Generally, management of a restricted-beam set including a set of restricted-beams may be managed by a base station 402. Accordingly, the example below generally discusses a base station 402 managed restricted-beam set. In other examples, other devices, including a network entity and/or a UE 404 may manage the restricted-beam set.

Figure 5:
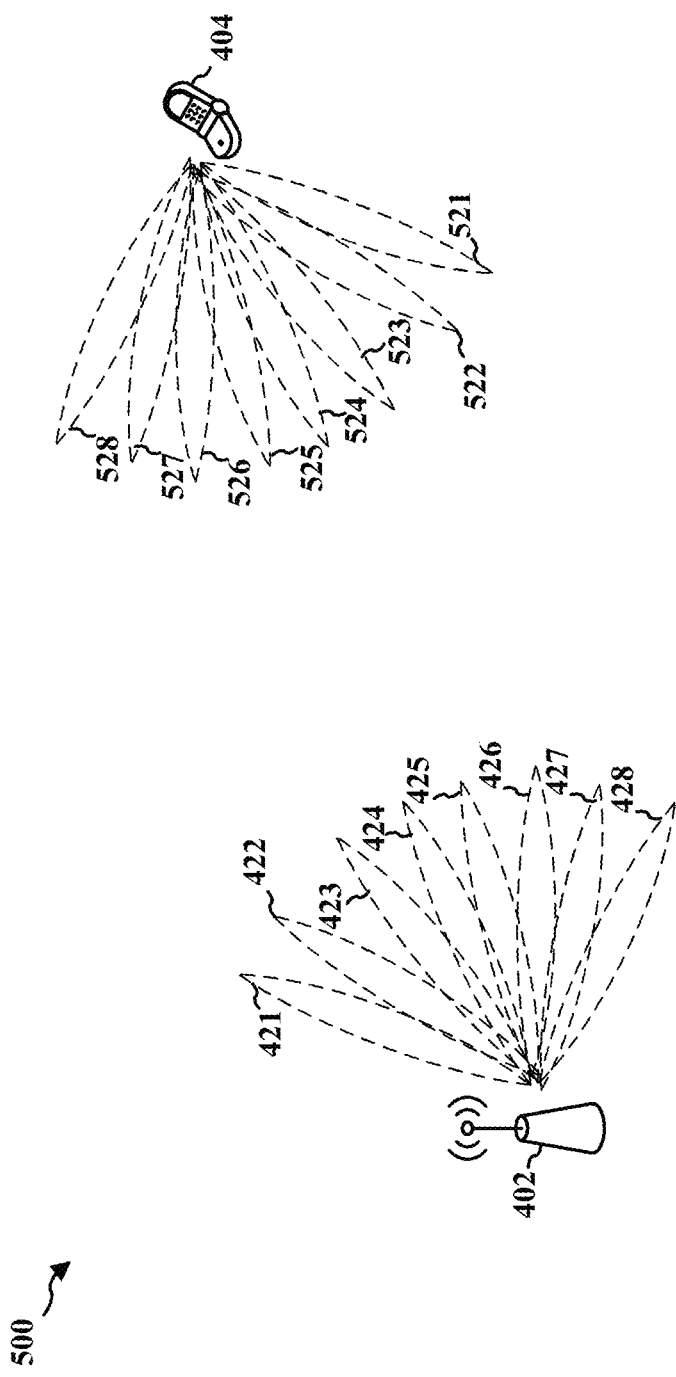
FIG. 5 is a diagram illustrated an example of communication system including the base station and the UE.

FIG. 5 is a diagram illustrated an example of communication system 500 including the base station 402 and the UE 404. In an aspect, a beam set for the base station 402 may contain, for example, eight different beams, e.g., the same or similar to the example illustrated in FIG. 4A illustrates eight beams 421, 422, 423, 424, 425, 426, 427, 428 for eight directions. In aspects, the base station 402 may be configured to beamform for transmission of at least one of the beams 421, 422, 423, 424, 425, 426, 427, 428 toward the UE 404. In one aspect, the base station 402 may sweep/transmit directions using eight ports during a slot (e.g., synchronization signal).

In an aspect, a beam set for the UE 404 may also contain, for example, eight different beams, e.g., eight beams 521, 522, 523, 524, 525, 526, 527, 528 for eight directions. In aspects, the UE 404 may be configured to beamform for transmission of at least one of the beams 521, 522, 523, 524, 525, 526, 527, 528 toward the UE 404. In one aspect, the UE 404 may sweep/transmit directions using eight ports during a slot (e.g., synchronization signal). FIG. 5 illustrates one possible example of beamforming in a communication system. The base station 402 and the UE 404 in the illustrated example each include eight different beams. In other examples, the base station 402 and/or the UE 404 may have different numbers of beams, e.g., more than eight beams or less than eight beams. Additionally, the base station 402 and the UE 404 are not required to have the same number of beams. The number of beams and the granularity of the beams may vary based on the antenna systems used by the base station 402 and the UE 404. For example, generally, antenna systems with greater numbers of elements may be capable of transmitting narrower beams.

An example device, e.g., the base station 402 (e.g., eNB/gNb) or the UE 404 may determine a restricted-beam set including at least one beam direction that is restricted for at least one of a transmission or a reception of an electromagnetic signal. For example, the base station 402 may determine that the beam 425 should be restricted. The determination may be based on a measurement of for example, a reference signal, or other transmission from the UE 404. The measurement may indicate that the beam 425 is subject to high path loss, for example, and should be restricted. Accordingly, the beam 425 may be added to the restricted-beam set. Thus, a base station 402 may determine the restricted-beam set by performing a measurement on a signal received from the second device (e.g., the UE 404).

Conversely, the UE 404 may determine that the beam 523 should be restricted. The determination may be based on a measurement of, for example, a reference signal, or other transmission from the base station 402. The measurement may indicate that the beam 523 is subject to high path loss, for example, and should be restricted. Accordingly, the beam 523 may be added to the restricted-beam set and the restricted-beam set may be transmitted to the base station 402. Thus, a base station 402 may determine the restricted-beam set by receiving the restricted-beam set from a second wireless device (e.g., the UE 404).

The base station 402 may maintain a restricted-beam set based on the determined restricted-beam set. As discussed above, the determined restricted-beam set may be determined by the base station 402 or the UE 404. When the UE 404 determines the determined restricted-beam set, the UE 404 may transmit the restricted-beam set to the base station 402 for use as the restricted-beam set. When the determined restricted-beam set is determined by the base station, the determined restricted-beam set may be the restricted-beam set.

The base station 402 may restrict at least one of the transmission or the reception of the electromagnetic signal based on the restricted-beam set. For example, the base station 402 may restrict use of the beam 425. Similarly, the UE 404 may restrict the beam 523. The restrictions of beams may be necessitated by, for example, path loss. A path loss may be caused by various things, including, but not limited to a user's hand blocking an antenna on the UE 404, disruptions in line of sight between the UE 404 and the base station 402, or any other disruption to a communication channel.

The base station 402 may determine an updated restricted-beam set including at least one beam direction that is restricted for at least one of transmission or reception of an electromagnetic signal. The base station 402 may need to monitor changes in the restricted-beam set (e.g., the received and/or locally generated restricted-beam set) to determine that the restricted-beam set is up to date, e.g., so that the correct beams are restricted and the correct beams are available for transmissions. The base station 402 may perform the monitoring to determine that the restricted set of beams (restricted-beam set) in the restricted-beam set is the correct set of beams.

The base station 402 may update the restricted-beam set based on the determined updated restricted-beam set. For example, an updated restricted-beam set may be received. The updated restricted-beam set may be compared to the restricted-beam. Additions may be added, deletions may be deleted. Alternatively, the updated list may overwrite the restricted-beam set. The base station 402 may specify when to remove beams (e.g., base station 402 beams 421, 422, 423, 424, 425, 426, 427, 428; UE 404 beams 521, 522, 523, 524, 525, 526, 527, 528) from the restricted-beam set. The base station 402 may specify when to add beams (e.g., base station 402 beams 421, 422, 423, 424, 425, 426, 427, 428; UE 404 beams 521, 522, 523, 524, 525, 526, 527, 528) to the restricted-beam set, e.g., based on one or more of locally generated information or information received from a UE 404, for example. The base station 402 may configure the restricted-beam set.

In aspect, the restricted-beam set and/or other restricted-beam related information may be transmitted with system information, L1 signaling, L2 signaling, and/or L3 signaling. RRC or L1/L2/L3 signaling may occur both when a UE is idle and when a UE is connected.

In an example, the base station 402 may indicate to the UE 402 not to transmit within x° of a particular direction, e.g., 10°. Accordingly, transmissions may be restricted from 10°±x°. In some examples, x may be based on the antenna systems used at the base station 402 and/or the UE 404.

In an aspect, the power transmitted by the UE 404 (or the base station 402) may be changed based on, for example, the direction of transmission, and the restricted-beam set in addition to other aspects that may impact power control.

In an aspect, the UE 404 may not transmit at a specified limit, e.g., specified by the base station 402, when transmitting using a beam in a restarted set. For example, the UE 404 may reduce the transmit power level to meet limits set by the base station 402. In another aspect, the UE 404 may change direction from a direction in a restricted-beam set, e.g., by ±5° in one example. (Other angular values, e.g., anywhere from 1° to 180° in various amounts of granularity may be used.) Granularity may be used on antenna systems, e.g., based on the number of antennas in a particular antenna system. More antenna elements may generally allow for a finer beam in some aspects.

In an aspect, in a network including the base station 402 and UEs 404, time in and time out of a restricted-beam set may be configurable.

In an aspect, adding a new beam or beam pair to a restricted-beam set may trigger a transmission of the restricted-beam set, e.g., to the base station 402.

In an aspect, transmission of a restricted-beam set, e.g., to the base station 402, may be triggered periodically.

In an aspect, the base station 402 may manage a restricted-beam set using reference signals.

In an aspect, the base station 402 may use a Received Signal Strength Indication (RSSI) for active beams, e.g., to make determinations related to adding beams to the restricted-beam set.

In an aspect, the UE 404 may transmit a report to the base station 402 indicating beams that may be added or deleted from the restricted-beam set. The report may include one or more of beam identification, beam signal quality, and/or restricted beams.

In an aspect, a restricted-beam set may be limited by the network.

In an aspect, the base station 402 may receive a restricted-beam set, add entries to an internal restricted-beam set, and/or subtract entries from the internal restricted-beam set. Thus, the base station 402 may enable or disable specific beams (e.g., base station 402 beams 421, 422, 423, 424, 425, 426, 427, 428; UE 404 beams 521, 522, 523, 524, 525, 526, 527, 528).

Figure 6:
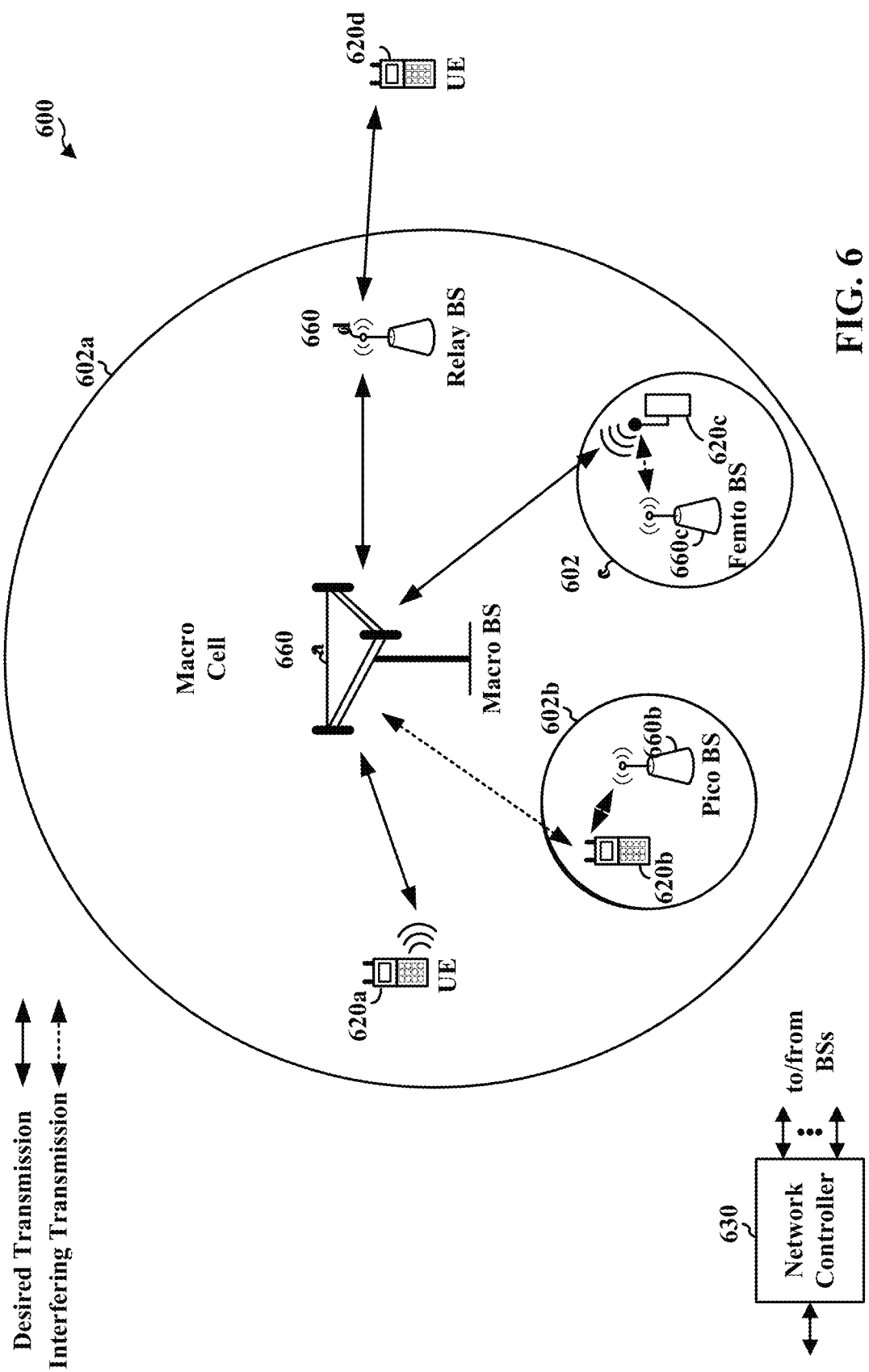
FIG. 6 is diagram illustrating an example of a wireless communication network.

FIG. 6 is a diagram illustrating a network 600 in which aspects of the present disclosure may be practiced. The network 600 may be an LTE network or some other wireless network, such as a 5G or NR network. Wireless network 600 may include a number of base stations 610 (shown as base station 610*a*, base station 610*b*, base station 610*c*, and base station 610*d*) and other network entities. A base station is an entity that communicates with user equipment (UEs) and may also be referred to as a base station, a NR base station, a Node B, a gNB, a 5G node B, an access point, a TRP, and/or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 6, a base station 610*a* may be a macro base station for a macro cell 602*a*, a base station 610*b* may be a pico base station for a pico cell 602*b*, and a base station 610*c* may be a femto base station for a femto cell 602*c*. A base station may support one or multiple (e.g., three) cells. The terms "eNB", "base station", "NR base station", "gNB", "TRP", "AP", "node B", "5G node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 600 through various types of backhaul interfaces such as a direct physical connection, a virtual network, and/or the like using any suitable transport network.

Wireless network 600 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 6, a relay station 610*d* may communicate with macro base station 610*a* and a UE 620*d* in order to facilitate communication between base station 610*a* and UE 620*d*. A relay station may also be referred to as a relay base station, a relay base station, a relay, and/or the like.

Wireless network 600 may be a heterogeneous network that includes base stations of different types, e.g., macro base stations, pico base stations, femto base stations, relay base stations, and/or the like. The different types of base stations may have different transmit power levels, different coverage areas, and different impact on interference in wireless network 600. For example, macro base stations may have a high transmit power level (e.g., 5 to 40 Watts) whereas pico base stations, femto base stations, and relay base stations may have lower transmit power levels (e.g., 0.1 to 2 Watts).

A network controller 630 may couple to a set of base stations and may provide coordination and control for these base stations. Network controller 630 may communicate with the base stations via a backhaul. The base stations may also communicate with one another, e.g., directly or indirectly via a wireless or wireline backhaul.

UEs 620 (e.g., 620*a*, 620*b*, 620*c*) may be dispersed throughout wireless network 600, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 6, a solid line with double arrows indicates desired transmissions between a UE and a serving base station, which is a base station designated to serve the UE on the downlink and/or uplink. A dashed line with double arrows indicates potentially interfering transmissions between a UE and a base station. In some aspects, a UE and a base station may communicate using a multi-beam technique that permits the UE and the base station to wirelessly communicate via one or more active beams. An active beam may include a beam pair that carries, for example, data and control channels. However, an active beam (e.g., a beam pair including a UE beam and a base station beam) may have one or more restrictions that may negatively impact wireless communication via the active beam. In some aspects, the base station and/or the UE may trigger and/or perform a communication-related action in order to improve wireless communications and/or comply with such a restriction, as described herein. In some aspects, the active beams may be in millimeter-wave (mmW) spectrum band Notably, while techniques and apparatuses described herein may be applied to wireless communications using multi-beam operation with active beams in a mmW spectrum band, other implementations are possible. For example, the techniques and apparatuses described herein may be applied to wireless communications that use multi-beam operation with active beams in another frequency band, such as a frequency band at or below approximately 6 gigahertz.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 6 is provided merely as an example. Other examples are possible and may differ from what was described with regard to FIG. 6.

Figure 7:
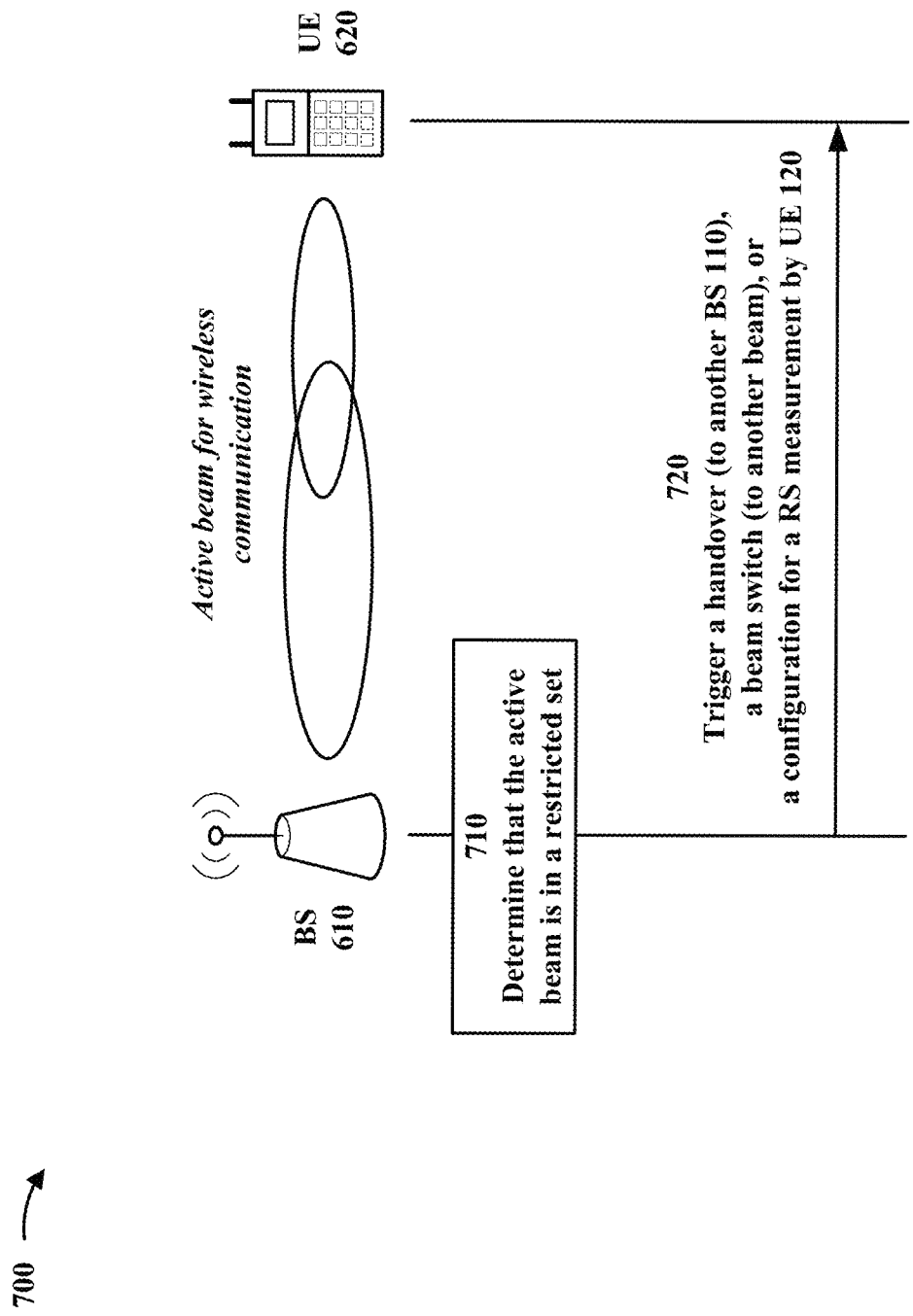
FIG. 7 is a diagram illustrating an example of a base station triggering a communication-related action based at least in part on determining that an active beam, associated with wireless communication between the base station and a UE, is in a restricted set including one or more beams on which the base station is restricted from at least one of receiving or transmitting wireless communications.

FIG. 7 is a diagram illustrating an example 700 of a base station triggering a communication-related action based at least in part on determining that an active beam, associated with wireless communication between the base station and a UE, is in a restricted-beam set including one or more beams on which the base station is restricted from at least one of receiving or transmitting wireless communications. As described above, the base station and the UE may operate using a multi-beam technique that permits the UE and the base station to wirelessly communicate via one or more active beams. In some aspects, such as when the base station and the UE are operating using NR technology, the active beams may be in a millimeter-wave (mmW) spectrum band (e.g., a band including frequencies at or above approximately 28 GHz, such as 60 GHz). At such relatively high frequencies, the small wavelengths of mmW beams enable use of a large number of antenna elements in a relatively small form factor. This characteristic of mmW enables directional beamforming techniques for forming narrow directional beams capable of sending and/or receiving sufficient energy to overcome propagation and/or path loss challenges typically associated with use of mmW beams. Notably, while techniques and apparatuses described herein may be applied to wireless communications using multi-beam operation with active beams in a mmW spectrum band, other implementations are possible. For example, the techniques and apparatuses described herein may be applied to wireless communications that use multi-beam operation with active beams in another frequency band, such as a frequency band at or below approximately 6 GHz.

At 710, base station 610 may determine that an active beam is in a restricted-bream set. The active beam may include a beam pair that may carry, for example, data and control channels, such as PDSCH, PDCCH, PUSCH, PUCCH, and/or the like. In some aspects, the active beam may be associated with multi-beam operation between base station 610 and UE 620. The restricted-beam set may include one or more beams that may not be used for at least one of transmitting data or receiving data. For example, a beam in the restricted-beam set may include a beam, associated with base station 610, that base station 610 may use for receiving an UL transmission, but may not use for transmitting a DL transmission. As another example, a beam in the restricted-beam set may include a beam, associated with base station 610, that base station 610 may not use for receiving an UL transmission, but may use for transmitting a DL transmission. As another example, a beam in the restricted-beam set may include a beam, associated with UE 620, that UE 620 may use for transmitting an UL transmission, but may not use for receiving a DL transmission. As another example, a beam in the restricted-beam set may include a beam, associated with UE 620, that UE 620 may not use for transmitting an UL transmission, but may use for receiving a DL transmission. In some aspects, a beam may be restricted due to lack of beam correspondence in the UL and the DL, imbalanced in the UL and the DL, a particular limitation that restricts communicating on the beam in a particular direction or both directions, and/or the like.

In some aspects, base station 610 may determine that the beam is included in the restricted-beam set based at least in part on restricted-beam set information accessible by base station 610. The restricted-beam set information may include information associated with and/or that identifies beams included in the restricted-beam set. In some aspects, base station 610 may determine the restricted-beam set information based at least in part on information provided by UE 620. For example, in some aspects, base station 610 may provide, to UE 620, configuration information that describes a manner in which UE 620 is to identify a beam as a restricted beam (e.g., based at least in part on one or more measurements associated with the beam). In this example, UE 620 may determine, in the identified manner, whether a given beam is to be included in the restricted set. In a case where UE 620 determines that the given beam is to be included in the restricted set, UE 620 may provide, to base station 610, restricted set information indicating that the given beam is to be included in the restricted set. As another example, UE 620 may provide restricted set information to base station 610 based at least in part on a configuration of UE 620 (e.g., when UE 620 is configured with a restriction associated with a given beam). In some aspects, base station 610 may receive the restricted-beam set information and/or the configuration information via radio resource control (RRC) dedicated, physical layer, or media access control (MAC) control element messaging. In some aspects, base station 610 may determine the restricted set information based at least in part on information measured and/or obtained by base station 610. For example, base station 610 may request that UE 620 provide one or more measurements associated with a given beam, and base station 610 may perform one or more other measurements, associated with the given beam, and may determine (e.g., based at least in part on configuration information accessible by base station 610) whether the given beam is to be included in the restricted set. In a case where base station 610 determines that the given beam is to be included in the restricted set, base station 610 may store restricted set information indicating that the given beam is to be included in the restricted set. In some aspects, base station 610 may provide the restricted set information to UE 620 (e.g., such that UE 620 may determine whether an active beam is in the restricted set, as described below).

In some aspects, base station 610 may determine that the active beam is in the restricted set based at least in part on the restricted set information. For example, base station 610 may determine, based at least in part on information that identifies the active beam and the restricted set information (e.g., information that identifies one or more beams that base station 610 and/or UE 620 cannot use to transmit and/or receive wireless communications), that the active beam is in the restricted set. In some aspects, base station 610 may make such a determination when a beam is selected as an active beam, on a periodic basis, based at least in part on receiving restricted set information from UE 620, based at least in part on determining restricted set information, and/or the like.

At 720, base station 610 may trigger a communication-related action based at least in part on determining that the active beam is included in the restricted set. A communication-related action triggered by base station 610 may include, for example, a handover of UE 620 to another base station 610, a request to switch the active beam to another beam, a configuration of UE 620 to perform a RS measurement (e.g., associated with base station 610 and/or another base station 610), and/or the like. In some aspects, the communication-related action triggered by base station 610 may be based at least in part on a RS measurement associated with UE 620 and/or base station 610. For example, base station 610 may request that UE 620 perform a DL RS measurement (e.g., associated with the active beam, a reference beam set, the restricted set, and/or the like), and UE 620 may perform the DL RS measurement and provide information associated with the DL RS measurement to base station 610. In some aspects, base station 610 may perform an UL RS measurement (e.g., associated with the active beam, the reference beam set, the restricted set, and/or the like). In some aspects, base station 610 may determine (e.g., based at least in part on the DL RS measurement and/or the UL RS measurement), that the active beam is UL limited (i.e., that signal quality on the UL is limited, even when DL signal quality is satisfactory). In some aspects, base station 610 may trigger the communication-related action based at least in part on the DL RS measurement, the UL RS measurement, and/or the determination that the active beam is UL limited. For example, base station 610 may determine whether to trigger a handover, request a switch to another active beam, and/or configure UE 620 for another RS measurement based at least in part on the DL RS measurement, the UL RS measurement, and/or the determination that the active beam is UL limited.

In some aspects, base station 610 may trigger a handover to a neighbor cell (e.g., associated with another base station 610) based at least in part on the restricted set information. For example, if base station 610 determines that a beam, including a transmit beam of base station 610 and a receive beam of UE 620, is in the restricted set, and if alternative beams (not in the restricted set) associated with base station 610 and UE 620 are not available, then base station 610 may trigger a handover to a neighbor cell (e.g., associated with a neighbor base station 610). However, if a beam including a transmit beam of the neighbor base station 610 and another receive beam of UE 620 is in the restricted set, then base station 610 may avoid handover to the other beam.

In some aspects, base station 610 may request and/or perform a beam switch based at least in part on the restricted set information. For example, base station 610 may determine that the active beam is in the restricted set, and base station 610 may switch the active beam to a different beam (e.g., a beam that is not in the restricted set) and/or a different beam direction.

In some aspects, the communication-related action, triggered by base station 610, may result in improved wireless communications by, for example, allowing base station 610 and UE 620 to communicate via another active beam (e.g., a beam associated with the other base station 610, a different beam associated with base station 610, and/or the like) that is not in the restricted set, thereby removing restrictions associated with communicating on the active beam.

As indicated above, FIG. 7 is provided as an example. Other examples are possible and may differ from what was described with respect to FIG. 7.

Figure 8:
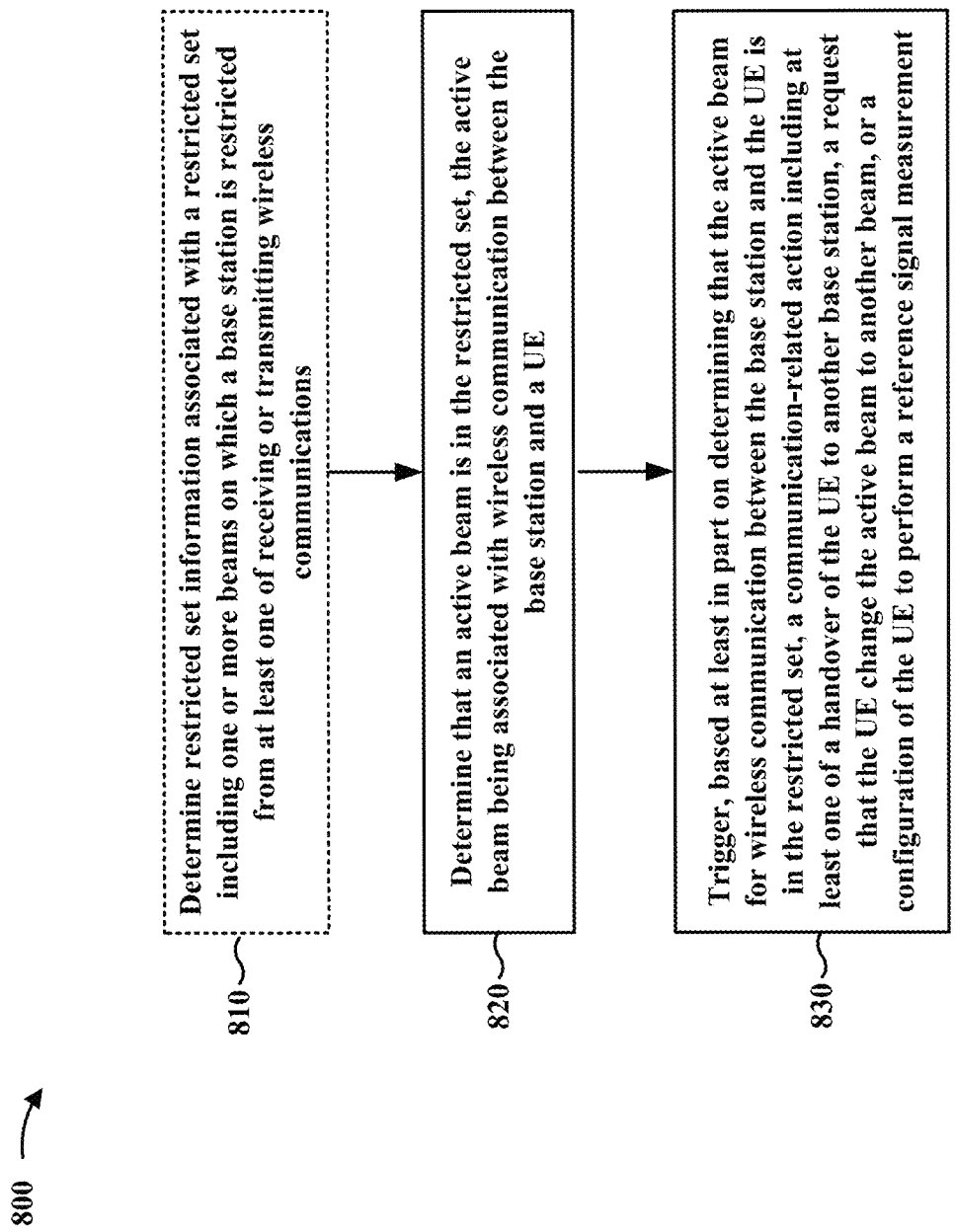
FIG. 8 is a flow chart of a method of wireless communication.

FIG. 8 is a flow chart of a method 800 of wireless communication. The method may be performed by a base station (e.g., base station 610 of FIG. 1, apparatus 902/902' of FIGS. 9 and 10, respectively, and/or the like). Blocks with dashed lines are optional.

At 810, the base station may determine restricted set information associated with a restricted set including one or more beams on which a base station is restricted from at least one of receiving or transmitting wireless communications. For example, the base station may determine restricted set information associated with a restricted set including one or more beams on which a base station is restricted from at least one of receiving or transmitting wireless communications, as described above with regard to FIG. 7.

At 820, the base station may determine that an active beam is in the restricted set, the active beam being associated with wireless communication between the base station and a UE. For example, the base station may determine that an active beam is in the restricted set, the active beam being associated with wireless communication between the base station and a UE, as described above with regard to FIG. 7.

In some aspects, the active beam may be determined to be in the restricted set based at least in part on the restricted set information indicating that the active beam is in the restricted set.

In some aspects, the active beam may be determined to be in the restricted set based at least in part on a measurement performed by the UE.

In some aspects, the active beam may be determined to be in the restricted set based at least in part on a measurement performed by the base station.

At 830, the base station may trigger, based at least in part on determining that the active beam for wireless communication between the base station and the UE is in the restricted set, a communication-related action including at least one of a handover of the UE to another base station, a request that the UE change the active beam to another beam, or a configuration of the UE to perform a reference signal measurement. For example, the base station may trigger, based at least in part on determining that the active beam for wireless communication between the base station and the UE is in the restricted set, a communication-related action including at least one of a handover of the UE to another base station, a request that the UE change the active beam to another beam, or a configuration of the UE to perform a reference signal measurement, as described above with regard to FIG. 7.

In some aspects, a downlink reference signal measurement may be requested based at least in part on the determination that the active beam is in the restricted set. In some aspects, the communication-related action may be triggered based at least in part on the downlink reference signal measurement.

In some aspects, an uplink reference signal measurement may be performed based at least in part on the determination that the active beam is in the restricted set. In some aspects, the communication-related action may be triggered based at least in part on the uplink reference signal measurement.

In some aspects, the active beam may be determined to be uplink limited based at least in part on the determination that the active beam is in the restricted set. In some aspects, the communication-related action may be triggered based at least in part on the determination that the active beam is uplink limited.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
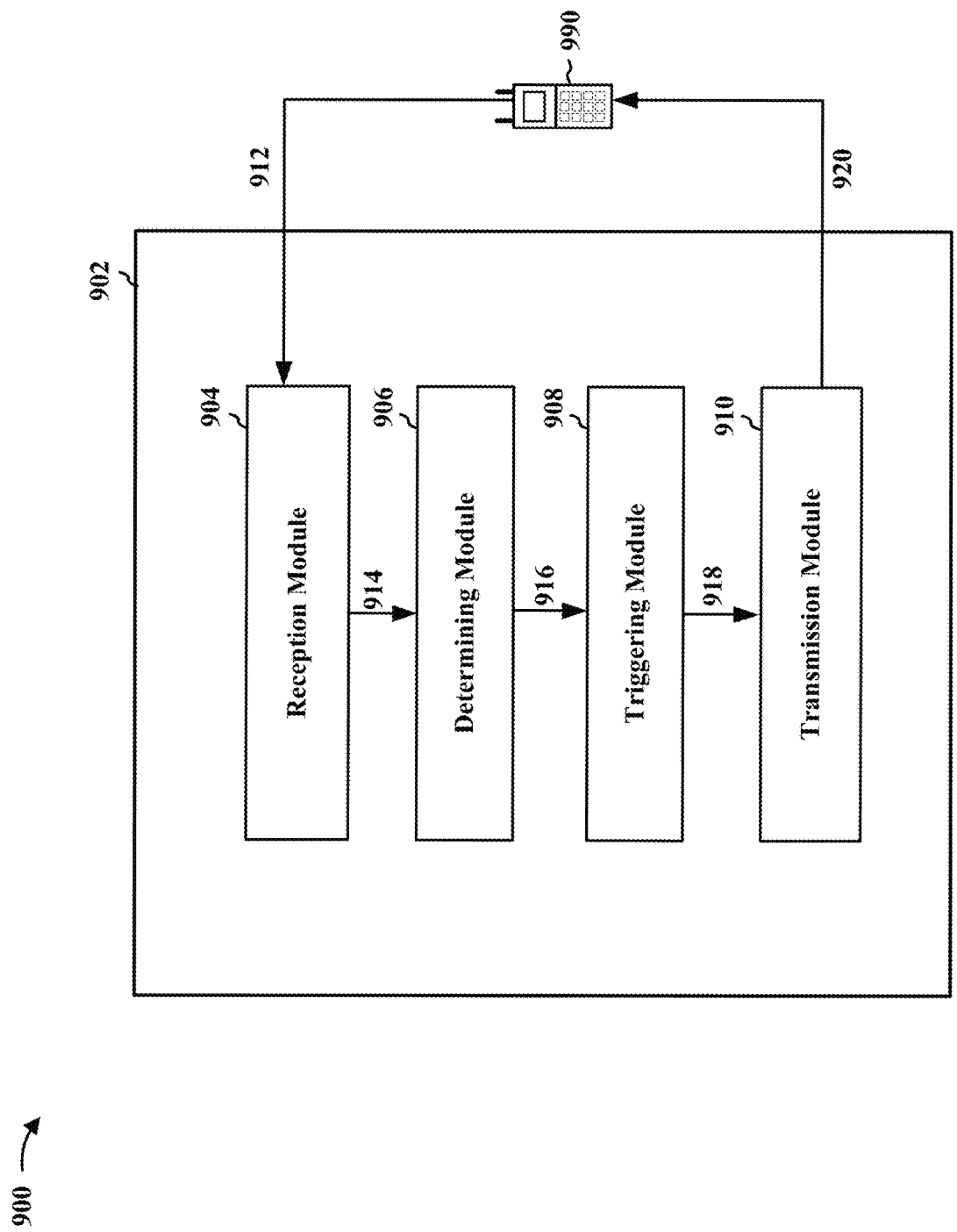
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a base station (e.g., base station 610 of FIG. 1). In some aspects, the apparatus 902 includes a reception module 904, a determining module 906, a triggering module 908, and/or a transmission module 910.

The reception module 904 may receive data 912 from a UE 950, such as data associated with a restricted set of beams on which the base station may be restricted from either transmitting or receiving data. In some aspects, the reception module 904 may provide data 914 to the determining module 906. In some aspects, the data 914 may indicate that the determining module 906 is to determine whether an active beam, associated with wireless communications between the base station and UE 950, is in the restricted set. The determining module 906 may determine that the active beam is in the restricted set.

The determining module 906 may provide data 916 to the triggering module 908. In some aspects, the data 916 may indicate that the triggering module 908 is to trigger a communication-related action based at least in part on the active beam being in the restricted set. The triggering module 908 may perform one or more communication-related actions, as described above.

The triggering module 908 may provide data 918 to the transmission module 910. For example, the triggering module 908 may provide data 918, including data associated with triggering the one or more communication-related actions, to transmission module 910. The transmission module 910 may transmit data 920, including the data associated with triggering the one or more communication-related actions to UE 950.

The apparatus may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
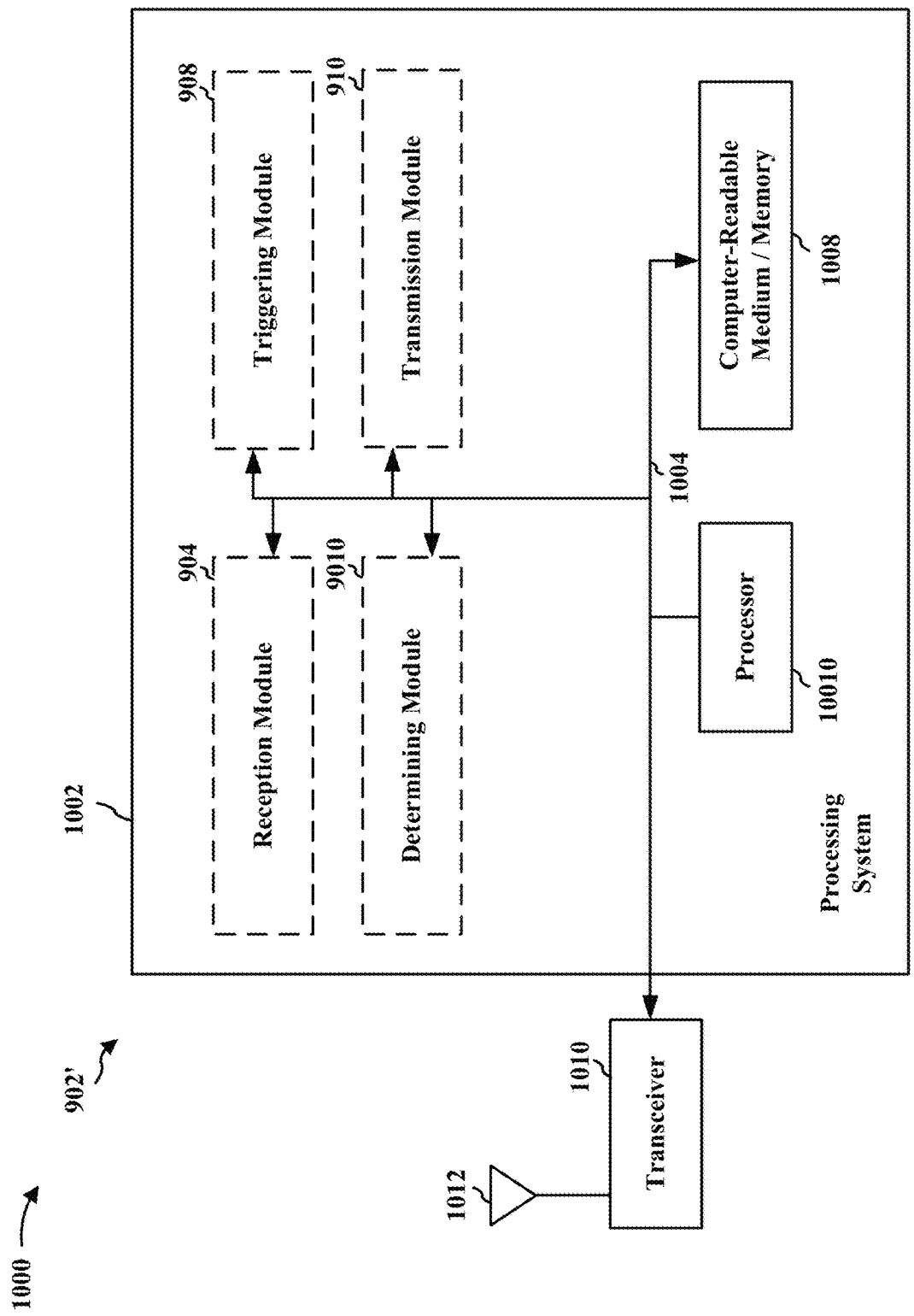
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be base station (e.g., base station 610 of FIG. 1).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, and 910. The modules may be software modules running in the processor 1006, resident/stored in the computer-readable medium/memory 1008, one or more hardware modules coupled to the processor 1006, or some combination thereof. The processing system 1002 may be a component of the base station 610 and may include the memory 376 and/or at least one of the TX processor 368, the RX processor 370, and/or the controller/processor 375.

In some aspects, the apparatus 902/902' for wireless communication includes means for determining that an active beam is in a restricted set, the active beam being associated with wireless communication between a base station and a UE, and the restricted set including one or more beams on which the base station is restricted from at least one of receiving or transmitting wireless communications; and means for triggering, by the base station and based at least in part on determining that the active beam for wireless communication between the base station and the UE is in the restricted set, a communication-related action including at least one of: a handover of the UE to another base station, a request that the UE change the active beam to another beam, or a configuration of the UE to perform a reference signal measurement. The aforementioned means may be one or more of the aforementioned modules of the apparatus 902 and/or the processing system 1002 of the apparatus 902' configured to perform the functions recited by the aforementioned means. As described supra, the processing system 1002 may include the TX processor 368, the RX processor 370, and/or the controller/processor 375. As such, in one configuration, the aforementioned means may be the TX processor 316, the RX processor 370, and/or the controller/processor 375 configured to perform the functions recited by the aforementioned means.

FIG. 10 is provided as an example. Other examples are possible and may differ from what was described in connection with FIG. 10.

Figure 11:
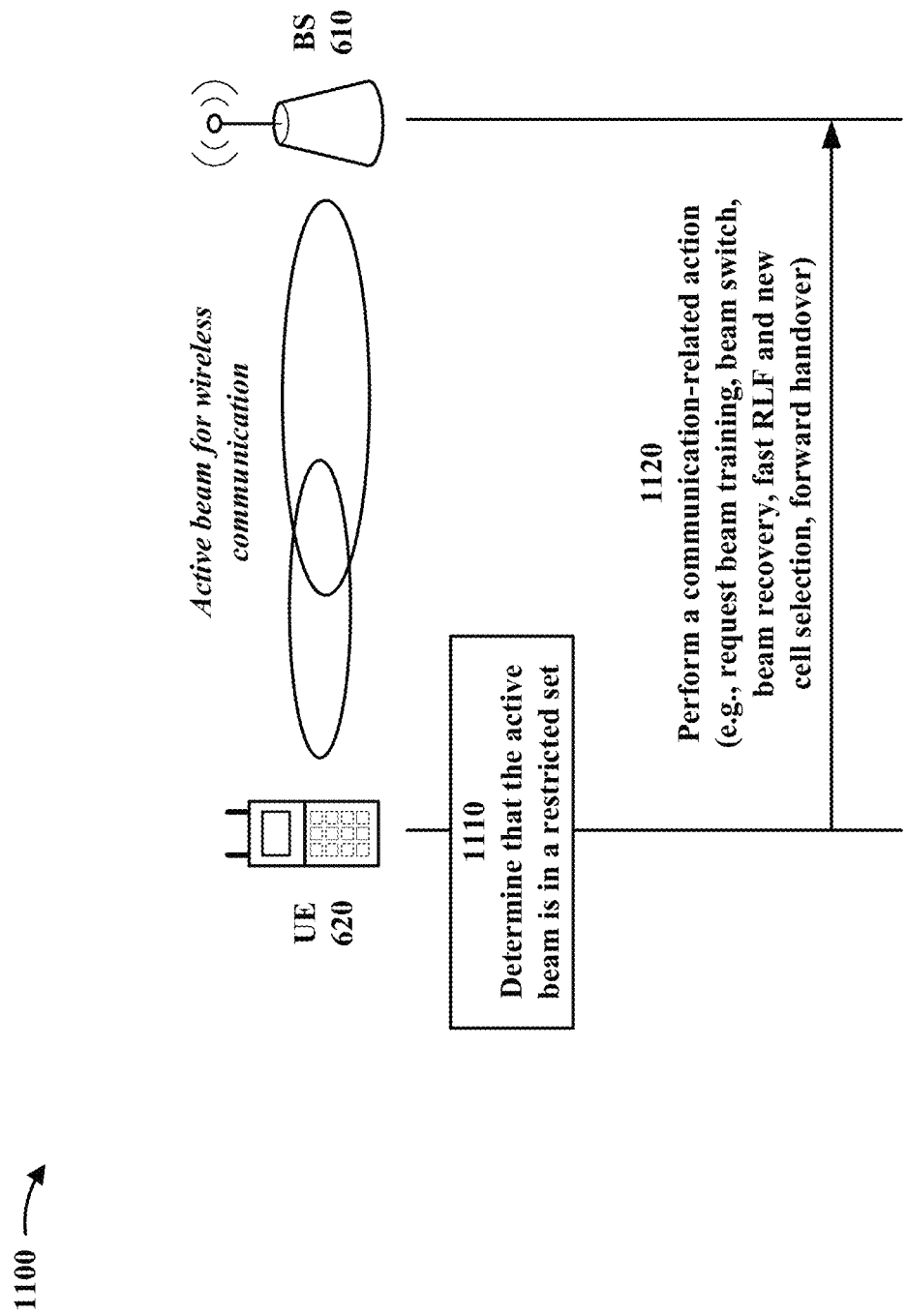
FIG. 11 is a diagram illustrating an example of a UE performing a communication-related action based at least in part on determining that an active beam, associated with wireless communication between the UE and a base station, is in a restricted set including one or more beams on which the UE is restricted from at least one of receiving or transmitting wireless communications.

FIG. 11 is a diagram illustrating an example 1100 of a UE performing a communication-related action based at least in part on determining that an active beam, associated with wireless communication between the UE and a base station, is in a restricted set including one or more beams on which the UE is restricted from at least one of receiving or transmitting wireless communications. As described above, the base station and the UE may operate using a multi-beam technique that permits the UE and the base station to wirelessly communicate via one or more active beams. In some aspects, such as when the base station and the UE are operating using NR technology, the active beams may be in mmW spectrum band. At these relatively high frequencies, the small wavelengths of mmW beams enable use of a large number of antenna elements in a relatively small form factor. This characteristic of mmW enables directional beamforming techniques for forming narrow directional beams capable of sending and/or receiving sufficient energy to overcome propagation and/or path loss challenges typically associated with use of mmW beams. Notably, while techniques and apparatuses described herein may be applied to wireless communications using multi-beam operation with active beams in a mmW spectrum band, other implementations are possible. For example, the techniques and apparatuses described herein may be applied to wireless communications that use multi-beam operation with active beams in another frequency band, such as a frequency band at or below approximately 6 GHz.

At 1110, UE 620 may determine that an active beam is in a restricted set. The active beam may include a beam pair that may carry, for example, data and control channels, such as PDSCH, PDCCH, PUSCH, PUCCH, and/or the like. In some aspects, the active beam may be associated with multi-beam operation between base station 610 and UE 620. The restricted set may include one or more beams that may not be used for at least one of transmitting data or receiving data, as described above. In some aspects, a beam may be restricted due to lack of beam correspondence in the UL and the DL, imbalanced in the UL and the DL, a particular limitation that restricts communicating on the beam in a particular direction, and/or the like.

In some aspects, UE 620 may determine that the beam is included in the restricted set based at least in part on restricted set information accessible by UE 620. The restricted set information may include information associated with and/or that identifies beams included in the restricted set. In some aspects, UE 620 may determine the restricted set information based at least in part on information provided by base station 610. For example, in some aspects, base station 610 may provide, to UE 620, configuration information that describes a manner in which UE 620 is to identify a beam as a restricted beam (e.g., based at least in part on one or more measurements associated with the beam). In this example, UE 620 may determine, in the identified manner, whether a given beam is to be included in the restricted set. In a case where UE 620 determines that the given beam is to be included in the restricted set, UE 620 may store restricted set information indicating the beam is in the restricted set. In some aspects, UE 620 may provide, to base station 610, restricted set information indicating that the given beam is to be included in the restricted set, and base station 610 may update stored restricted set information, associated with UE 620, based at least in part on the restricted set information. As another example, UE 620 may receive restricted set information from base station 610 (e.g., when base station 610 determines that a given beam is to be included in the restricted set). In some aspects, UE 620 may receive the restricted set information and/or the configuration information via RRC dedicated, physical layer, or MAC control element messaging.

In some aspects, UE 620 may determine that the active beam is in the restricted set based at least in part on the restricted set information. For example, UE 620 may determine, based at least in part on information that identifies the active beam and the restricted set information (e.g., information that identifies one or more beams that base station 610 and/or UE 620 cannot use to transmit and/or receive wireless communications), that the active beam is in the restricted set. In some aspects, UE 620 may make such a determination when a beam is selected as an active beam, on a periodic basis, based at least in part on receiving restricted set information from base station 610, based at least in part on determining restricted set information, and/or the like.

In some aspects, UE 620 may use the restrict set information for another purpose, such as radio resource management when UE 620 operates in a radio resource control (RRC) connected mode, a RRC idle mode, a RRC inactive mode, and/or the like.

At 1620, UE 620 may perform a communication-related action based at least in part on determining that the active beam is included in the restricted set. A communication-related action performed by UE 620 may include, for example, a request for beam training associated with a particular beam direction. Here, UE 620 may specify the particular direction based at least in part on a synchronization signal (SS) beam identifier, such as a NR-SS beam identifier. As another example, the communication-related action performed by UE 620 may include a switch to and/or a request to switch to another beam associated with base station 610. As another example, the communication-related action performed by UE 620 may include performing beam recovery using another beam that is not included in the restricted set. Here, UE 620 may transmit cause information and/or a measurement report to base station 610 during the beam recovery (e.g., the cause information may identify a cause of the beam recovery as being associated with the restricted set, and the measurement report may be associated with the restricted set). As another example, the communication-related action performed by UE 620 may include performing a fast RLF and selecting another cell (e.g., a neighbor cell associated with another base station 610). In some aspects, UE 620 may perform the fast RLF and cell selection when all beams of a serving cell, associated with base station 610, are in the restricted set. As another example, the communication-related action performed by UE 620 may include performing a forward handover. In some aspects, UE 620 may perform the forward handover when UE 620 determines that a restricted set, associated with a target base station 610, includes fewer beams than the restricted set associated with the serving base station 610. Similarly, in some aspects, UE 620 may perform the forward handover when UE 620 determines that the target base station 610 has more beams available for communication that are not in the restricted set, than number of beams available for communication from the serving base station 610.

In some aspects, the communication-related action performed by UE 620 may be based at least in part on information associated with a signal quality of an UL transmission associated with UE 620 and base station 610. For example, UE 620 may determine (e.g., based at least in part on feedback on the DL regarding the signal quality; based at least in part on an amount of transmission power, associated with the uplink transmission, satisfying a threshold; and/or the like) the information associated with the signal quality of the UL transmission. Here, UE 620 may determine whether to request beam training, request and/or specify a beam switch, perform beam recovery, perform a fast RLF and select anew cell, and/or perform a forward handover based at least in part on the information associated with the signal quality of the UL transmission.

In some aspects, UE 620 may request and/or perform a beam switch based at least in part on the restricted set information. For example, UE 620 may determine that the active beam is in the restricted set, and UE 620 may request and/or perform a switch of the active beam to a different beam (e.g., a beam that is not in the restricted set) and/or a different beam direction.

In some aspects, the communication-related action, performed by UE 620, may result in improved wireless communications by, for example, allowing base station 610 and UE 620 to communicate via another active beam (e.g., a beam associated with another base station 610, a different beam associated with base station 610, and/or the like) that is not in the restricted set, thereby removing restrictions associated with communication on the active beam.

As indicated above, FIG. 11 is provided as an example. Other examples are possible and may differ from what was described with respect to FIG. 11.

Figure 12:
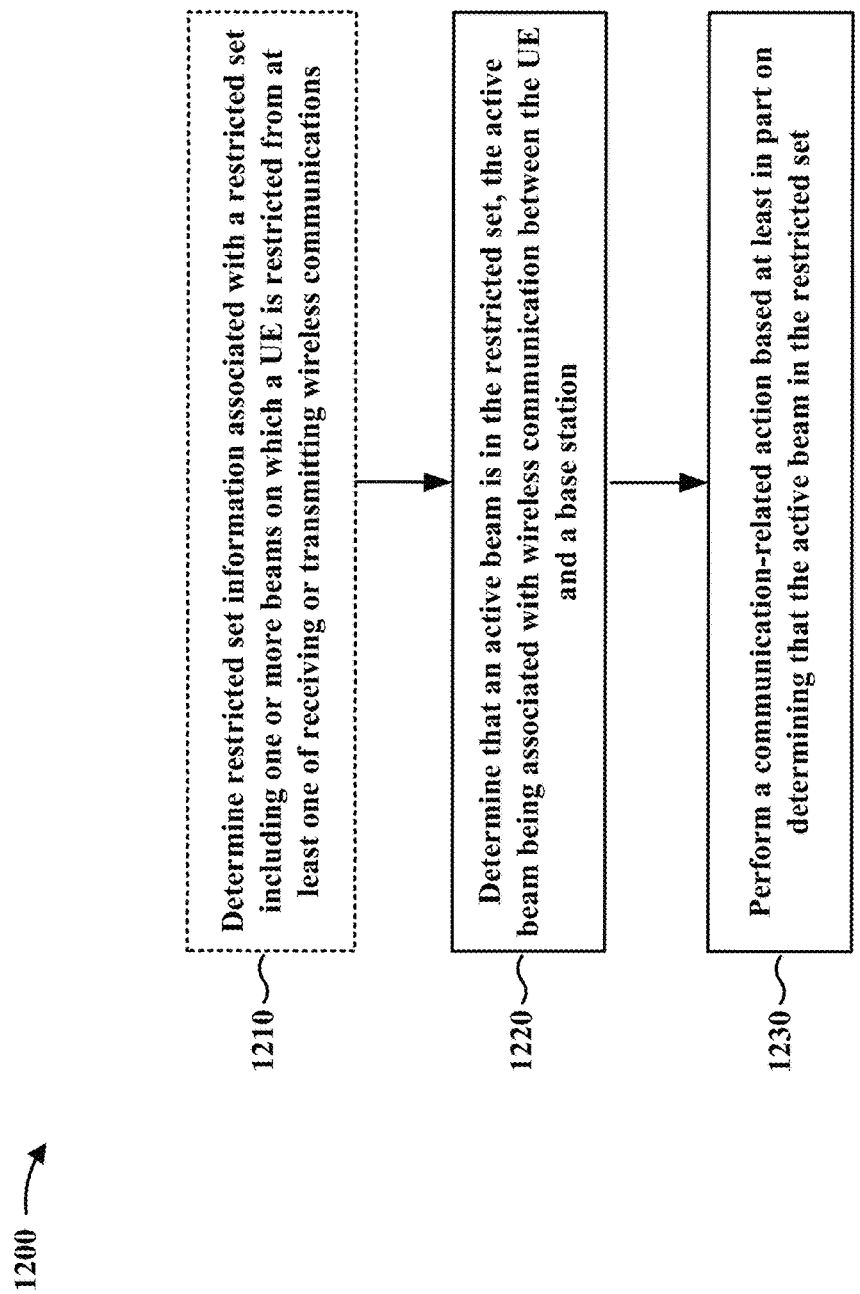
FIG. 12 is a flow chart of another method of wireless communication.

FIG. 12 is a flow chart of a method 6200 of wireless communication. The method may be performed by a UE (e.g., UE 620, apparatus 1302/1302', and/or the like). Blocks with dashed lines are optional.

At 1210, the UE may determine restricted set information associated with a restricted set including one or more beams on which a UE is restricted from at least one of receiving or transmitting wireless communications. For example, the UE may determine restricted set information associated with a restricted set including one or more beams on which a UE is restricted from at least one of receiving or transmitting wireless communications, as described above with regard to FIG. 11.

In some aspects, the active beam may be determined to be in the restricted set based at least in part on restricted set information indicating that the active beam is in the restricted set.

In some aspects, the active beam may be determined to be in the restricted set based at least in part on a measurement performed by the UE.

At 1220, the UE may determine that an active beam is in the restricted set, the active beam being associated with wireless communication between the UE and a base station. For example, the UE may determine that an active beam is in the restricted set, the active beam being associated with wireless communication between the UE and a base station, as described above with regard to FIG. 11.

At 1230, the UE may perform a communication-related action based at least in part on determining that the active beam is in the restricted set. For example, the UE may perform a communication-related action based at least in part on determining that the active beam in the restricted set, as described above with regard to FIG. 11.

In some aspects, information associated with a signal quality of an uplink transmission may be determined based at least in part on the determination that the active beam is in the restricted set. In some aspects, the communication-related action is performed based at least in part on the information associated with the signal quality of the uplink transmission. In some aspects, the information associated with the signal quality of the uplink transmission may be determined based at least in part on an amount of transmission power, associated with the uplink transmission, satisfying a threshold.

In some aspects, the communication-related action may include requesting beam training associated with a particular direction. The particular direction may be specified based at least in part on a synchronization signal beam identifier.

In some aspects, the communication-related action may include requesting a switch to another beam associated with the base station.

In some aspects, the communication-related action may include performing a beam recovery procedure using another beam that is not included in the restricted set. In some aspects, cause information and a measurement report may be transmitted to the base station during the beam recovery procedure, the cause information identifying a cause for the beam recovery such as the active beam being associated with the restricted set, and the measurement report being associated with the restricted set.

In some aspects, the communication-related action may include performing a fast radio link failure and selecting another cell.

In some aspects, the communication-related action may include performing a forward handover.

In some aspects, information associated with restricted set may be used for radio resource management when the UE operates in a RRC connected mode, a RRC idle mode, or a RRC inactive mode.

Although FIG. 12 shows example blocks of a method of wireless communication, according to some aspects, the method may include additional blocks, fewer blocks, different blocks, or differently arranged blocks than those shown in FIG. 12 in accordance with other aspects. Additionally, or alternatively, two or more blocks shown in FIG. 12 may be performed in parallel.

Figure 13:
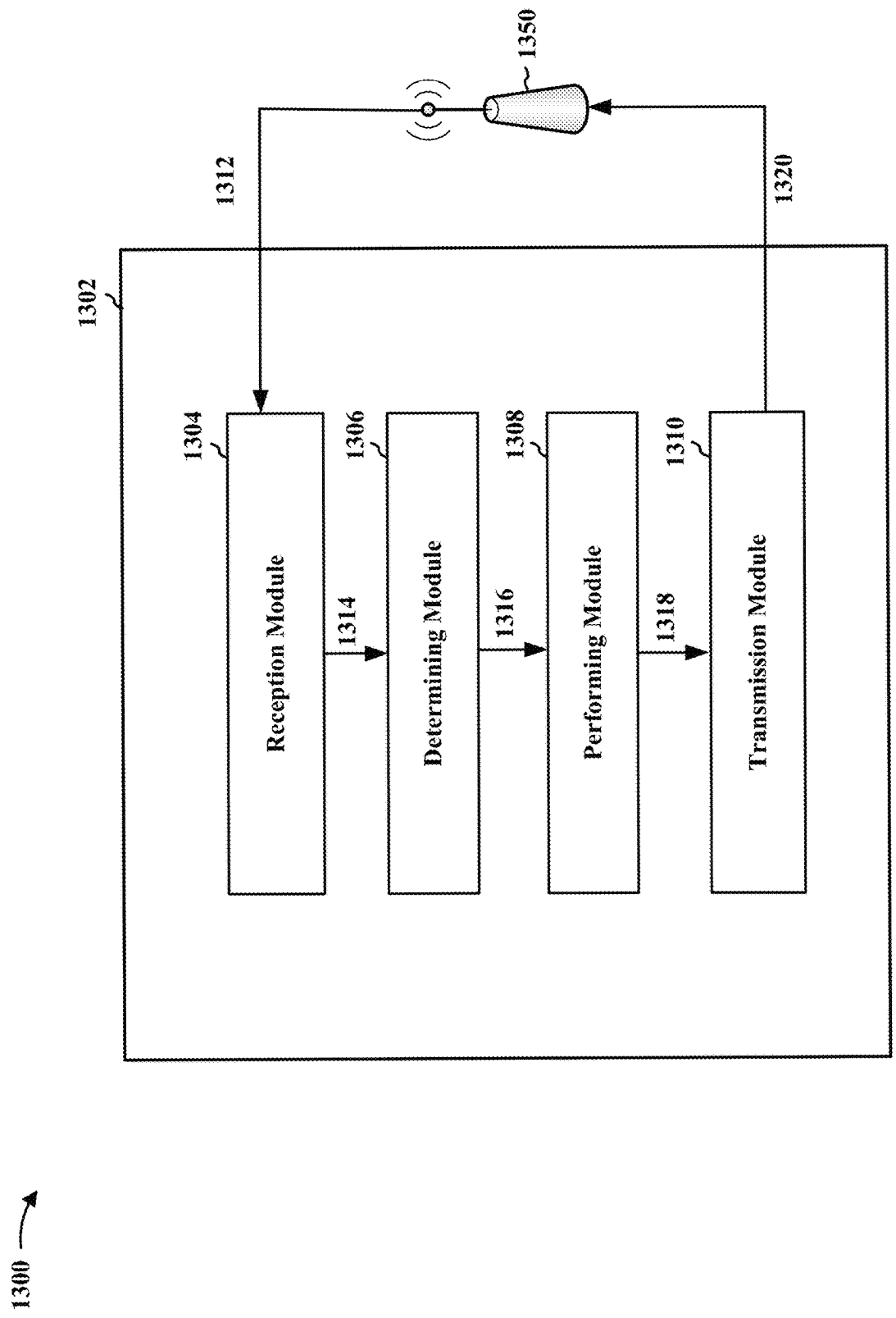
FIG. 13 is a conceptual data flow diagram illustrating the data flow between different modules/means/components in another example apparatus.

FIG. 13 is a conceptual data flow diagram 1300 illustrating the data flow between different modules/means/components in an example apparatus 1302. The apparatus 1302 may be a UE (e.g., UE 620). In some aspects, the apparatus 1302 includes a reception module 1304, a determining module 1306, a performing module 1308, and/or a transmission module 1310.

The reception module 1304 may receive data 1312 from a base station 1350, such as data associated with a restricted set of beams on which the UE may be restricted from transmitting and/or receiving data. In some aspects, the reception module 1304 may provide data 1314 to the determining module 1306. In some aspects, the data 1314 may indicate that the determining module 1306 is to determine whether an active beam, associated with wireless communications between the UE and base station 1350, is in the restricted set. The determining module 1306 may determine that the active beam is in the restricted set.

The determining module 1306 may provide data 1316 to the performing module 1308. In some aspects, the data 1316 may indicate that the performing module 1308 is to perform a communication-related action based at least in part on the active beam being in the restricted set. The performing module 1308 may perform one or more communication-related actions, as described above.

The performing module 1308 may provide data 1318 to the transmission module 1310. For example, the performing module 1308 may provide data 1318, including data associated with performing the one or more communication-related actions, to transmission module 1310. The transmission module 1310 may transmit data 1320, including the data associated with performing the one or more communication-related actions to base station 1350.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
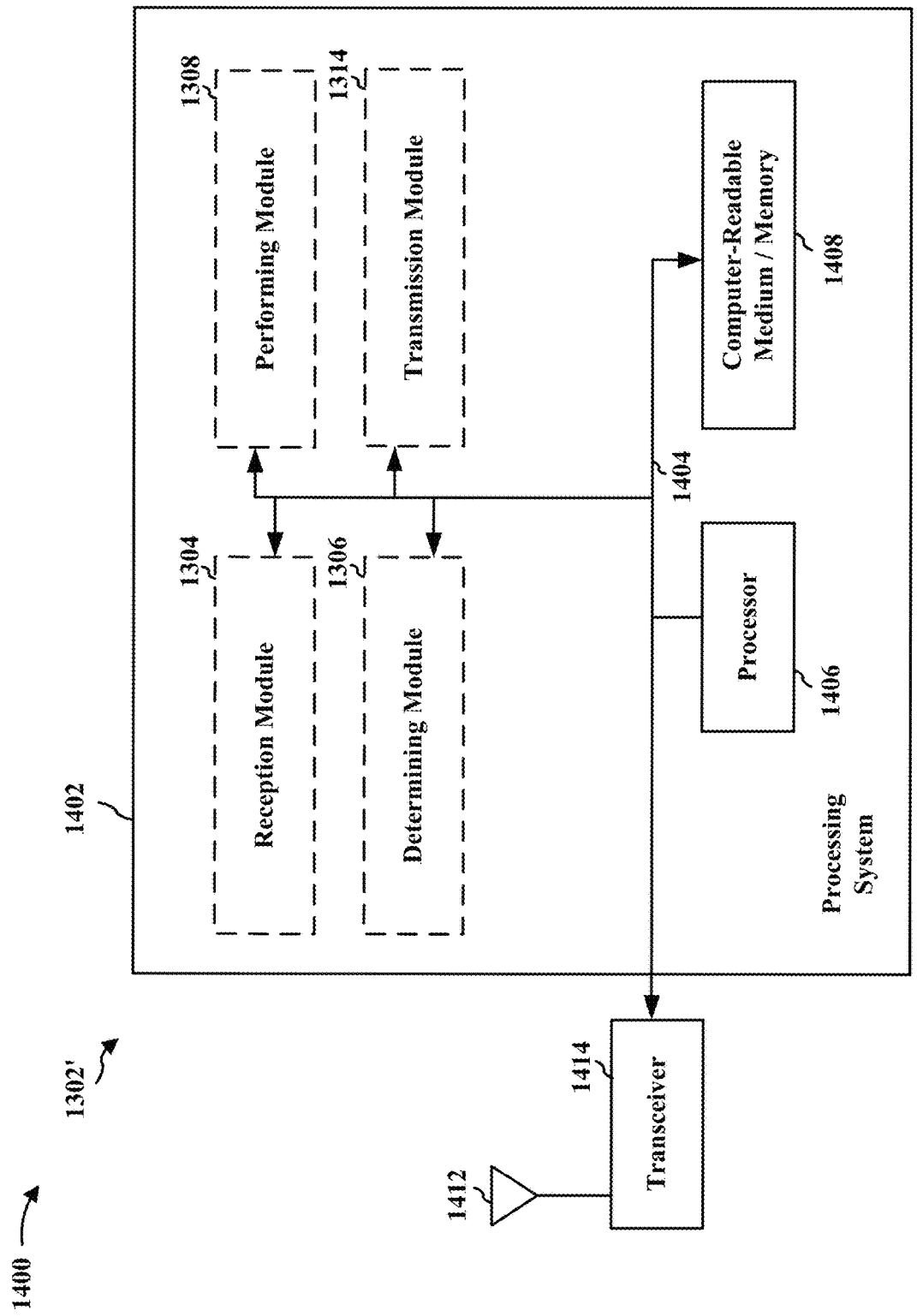
FIG. 14 is a diagram illustrating an example of a hardware implementation for the other apparatus employing a processing system.

FIG. 14 is a diagram 1400 illustrating an example of a hardware implementation for an apparatus 1302' employing a processing system 1402. The apparatus 1302' may be a UE (e.g., UE 620 of FIG. 1).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, 1310, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1310, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, and 1310. The modules may be software modules running in the processor 1406, resident/stored in the computer-readable medium/memory 1408, one or more hardware modules coupled to the processor 1406, or some combination thereof. The processing system 1402 may be a component of UE 350 and may include the memory 360 and/or at least one of the TX processor 368, the RX processor 356, and/or the controller/processor 359.

In some aspects, the apparatus 1302/1302' for wireless communication includes means for determining that an active beam is in a restricted set, the active beam being associated with wireless communication between a UE and a base station, and the restricted set including one or more beams on which the UE is restricted from at least one of receiving or transmitting wireless communications; and means for performing a communication-related action based at least in part on determining that the active beam is in the restricted set. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX processor 368, the RX processor 356, and/or the controller/processor 359. As such, in one configuration, the aforementioned means may be the TX processor 368, the RX processor 356, and/or the controller/processor 359 configured to perform the functions recited by the aforementioned means.

FIG. 14 is provided as an example. Other examples are possible and may differ from what was described in connection with FIG. 14.

Figure 15:
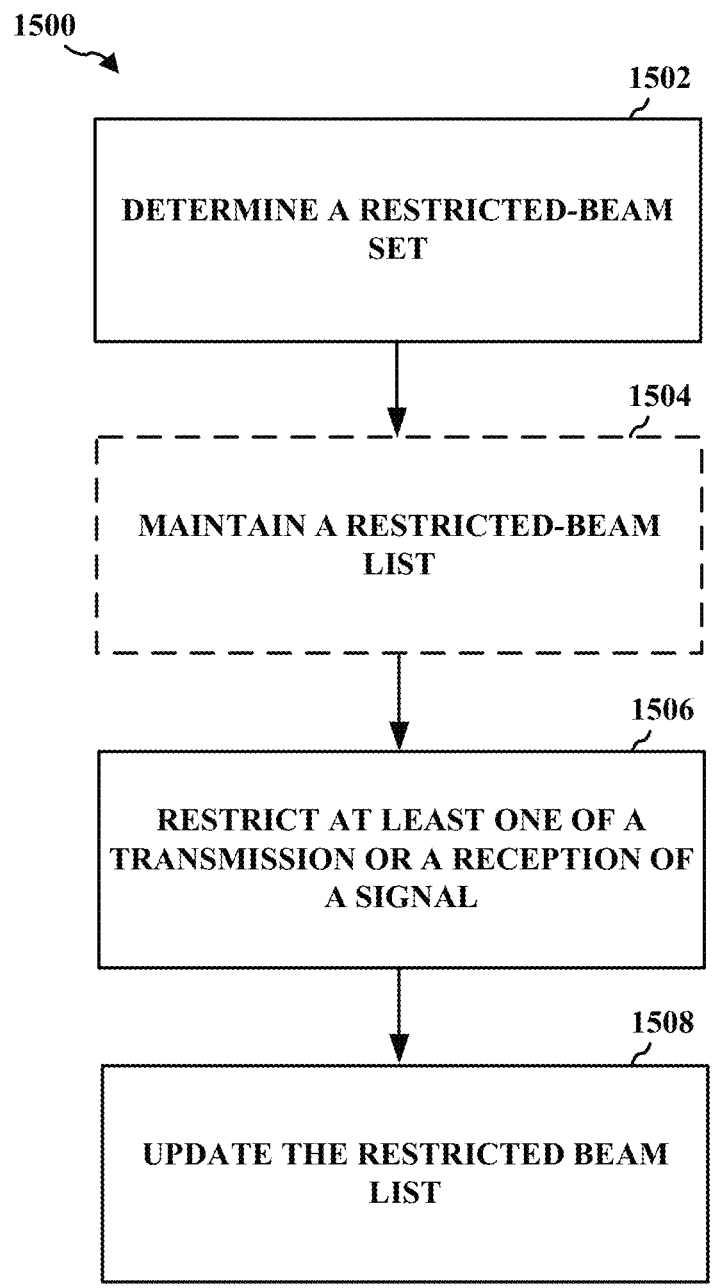
FIG. 15 is a flowchart of a method of wireless communication in accordance with the systems and methods described herein.

FIG. 15 is a flowchart 1500 of a method of wireless communication in accordance with the systems and methods described herein. The method may be performed by an base station (e.g., the base station 102, 310, 402) or in some examples, the UE 104, 350, 404. At block 1502, the base station determines a restricted-beam set including at least one beam direction that is restricted for at least one of a signal transmission or a signal reception. For example, the base station may determine a restricted-beam set including at least one beam direction that is restricted for at least one of a signal transmission or a signal reception by reviewing a set of possible beams to determine which beams are restricted in reception, transmission, or both and developing a list of the restricted beams. The list of beams that are restricted may form the restricted beam set.

In an aspect, a handoff may occur based on a restricted-beam set. For example, if no adequate beams are available for a transmission between the base station 402 and the UE 404 a handoff may occur. In an aspect, radio resource manager (RRM) may be used for cell level mobility signaling, e.g., L3, for example, signaling related to handoffs based on the restricted-beam set.

In an aspect, signaling to enable or disable various beams (e.g., base station 402 beams 421, 422, 423, 424, 425, 426, 427, 428; UE 404 beams 521, 522, 523, 524, 525, 526, 527, 528) may be based on L1 or L2 signaling.

In an aspect, reporting may use L1 control signaling.

At block 1504, the base station may maintain a restricted-beam set based on the determined restricted-beam set. For example, the base station (e.g., the base station 102, 310, 402) may maintain a restricted-beam set based on the determined restricted-beam set. The base station may maintain a restricted-beam set based on the determined restricted-beam set by storing a list of restricted-beams, e.g., in a memory.

At block 1506, the base station restricts at least one of a transmission or a reception of a signal based on the restricted-beam set. For example, the base station (e.g., the base station 102, 310, 402) restricts at least one of a transmission or a reception of a signal based on the restricted-beam set. The base station restricts at least one of a transmission or a reception of a signal based on the restricted-beam set by reviewing a list of restricted beams and not allowing at least one of a transmission or a reception of a signal based on the review of the list of the restricted-beam set.

At block 1508, the base station updates the restricted-beam set by adding or removing at least one beam direction to the restricted set corresponding to at least one of signal transmission or signal reception. In an example, the base station (e.g., the base station 102, 310, 402) updates the restricted-beam set by adding or removing at least one beam direction to the restricted set corresponding to at least one of signal transmission or signal reception. For example, the base station may periodically review a set of possible beams to determine which beams are still restricted, e.g., in reception, transmission, or both reception and transmission, developing an updated list of the restricted beams. In an aspect, the restricted-beam set may be updated based on configuration sent by an base station to declare if a beam-pair needs to be added/removed from restricted beam set.

Figure 16:
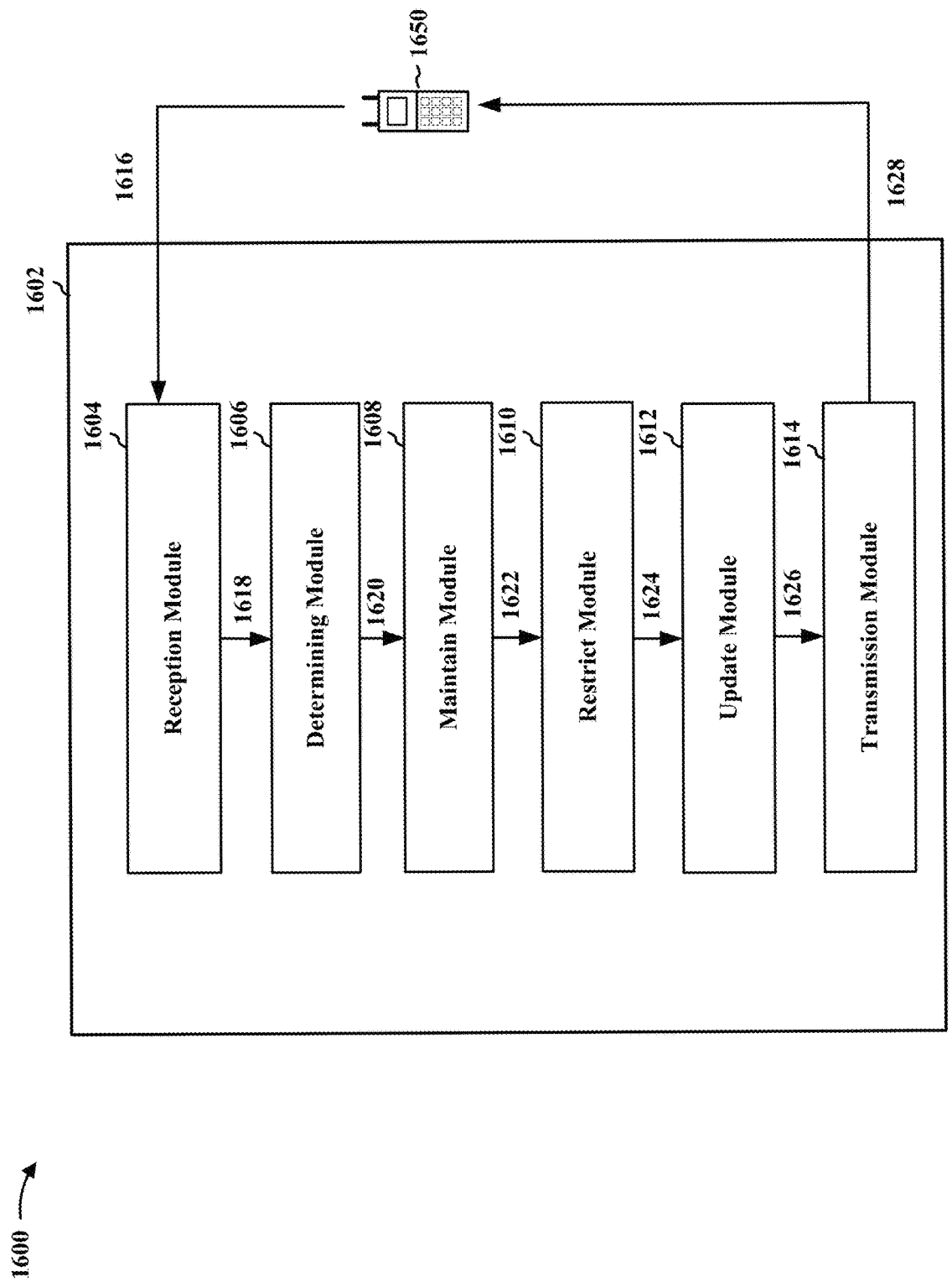
FIG. 16 is a conceptual data flow diagram illustrating the data flow between different modules/means/components in another example apparatus.

FIG. 16 is a conceptual data flow diagram 1600 illustrating the data flow between different modules/means/components in an example apparatus 1602. The apparatus 1602 may be a UE (e.g., UE 620). In some aspects, the apparatus 1602 includes a reception module 1604, a determining module 1606, a maintain module 1608, a restrict module 1610, an update module 1612, and/or a transmission module 1614.

The reception module 1604 may receive data 1616 from a UE 1650. In some aspects, the reception module 1604 may provide data 1618 to the determining module 1606. In some aspects, the determining module 1606 may determine a restricted-beam set.

The determining module 1606 may provide data 1620 to the maintain module 1608. In some aspects, the data 1616 may indicate the restricted-beam set. The restricted-beam set may be maintained by maintain module 1608.

The maintain module 1608 may provide data 1622 to the restrict module 1610. Accordingly, the restrict module 1610 may restrict at least one of a transmission or a reception of a signal, e.g., based on the data 1622 which may include the restricted-beam list. The restricted module may send data to the update module, such as the restricted-beam list. Accordingly, the update module 1612 may update the restricted beam list. The update module 1612 may send data 1626 to the transmission module so that the transmission module 1614 may transmit data 1628, including the data associated with performing the one or more communication-related actions to UE 1650.

The apparatus may include additional modules that perform each of the blocks of the algorithm in the aforementioned flow chart of FIG. 15. As such, each block in the aforementioned flow chart of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
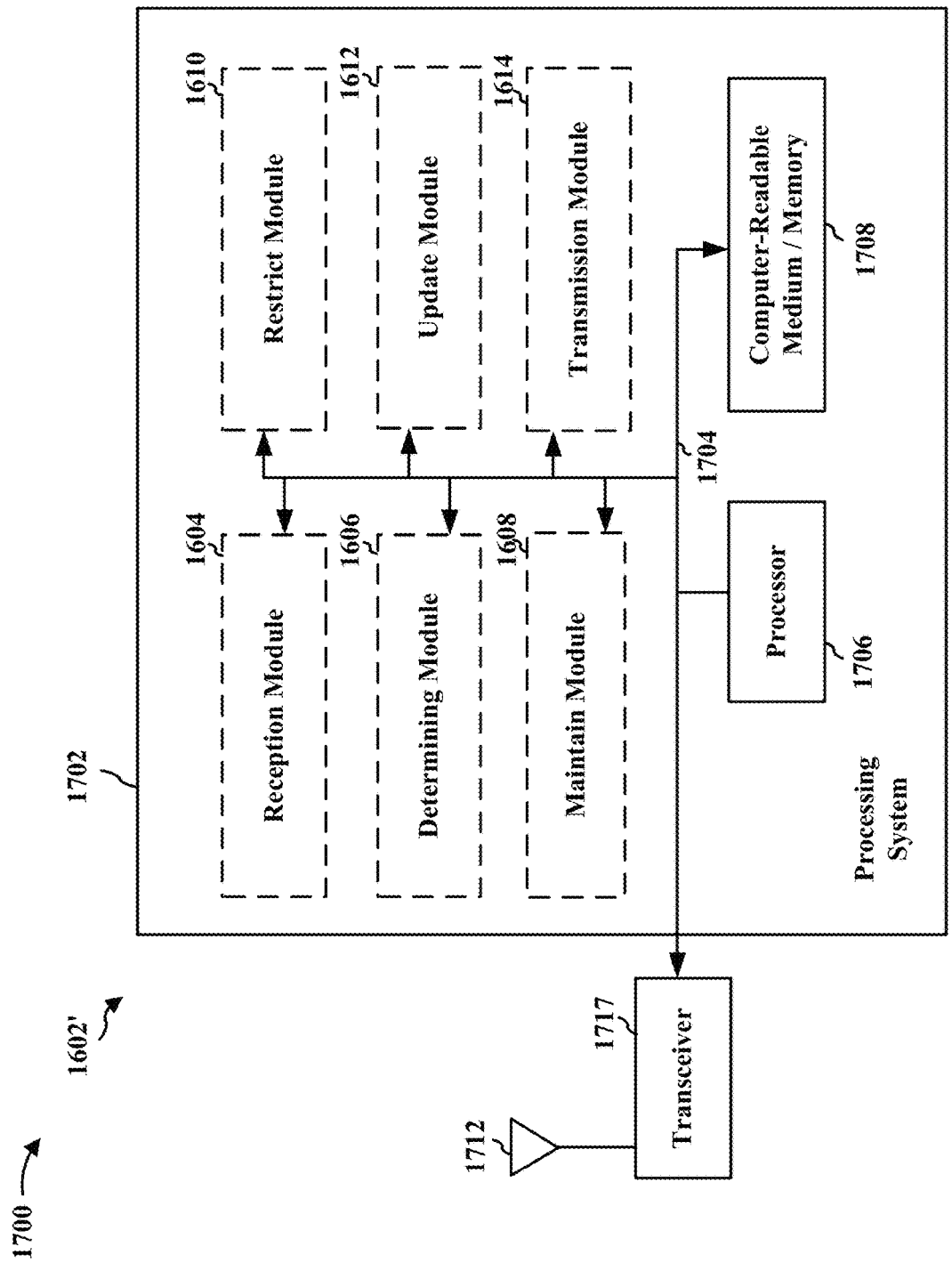
FIG. 17 is a diagram illustrating an example of a hardware implementation for the other apparatus employing a processing system.

FIG. 17 is a diagram 1700 illustrating an example of a hardware implementation for an apparatus 1602' employing a processing system 1702. The apparatus 1602' may be a UE (e.g., UE 620 of FIG. 1).

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, 1608, 1610, and the computer-readable medium/memory 1708. The bus 1704 may also link various other circuits such as timing sources, peripherals, voltage regulators, and power management circuits, which are well known in the art, and therefore, will not be described any further.

The processing system 1702 may be coupled to a transceiver 1710. The transceiver 1710 is coupled to one or more antennas 1712. The transceiver 1710 provides a means for communicating with various other apparatus over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1610, and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/memory 1708. The software, when executed by the processor 1706, causes the processing system 1702 to perform the various functions described supra for any particular apparatus. The computer-readable medium/memory 1708 may also be used for storing data that is manipulated by the processor 1706 when executing software. The processing system further includes at least one of the modules 1604, 1606, 1608, and 1610. The modules may be software modules running in the processor 1706, resident/stored in the computer-readable medium/memory 1708, one or more hardware modules coupled to the processor 1706, or some combination thereof. The processing system 1702 may be a component of UE 350 and may include the memory 360 and/or at least one of the TX processor 368, the RX processor 356, and/or the controller/processor 359.

In some aspects, the apparatus 1602/1602' for wireless communication includes means for determining a restricted-beam set; means for maintaining a restricted-beam list, means for restricting at least one of a transmission or a reception of a signal; and means for updating the restricted beam list. The aforementioned means may be one or more of the aforementioned modules of the apparatus 1602 and/or the processing system 1702 of the apparatus 1602' configured to perform the functions recited by the aforementioned means. As described supra, the processing system 1702 may include the TX processor 368, the RX processor 356, and/or the controller/processor 359. As such, in one configuration, the aforementioned means may be the TX processor 368, the RX processor 356, and/or the controller/processor 359 configured to perform the functions recited by the aforementioned means.

FIG. 17 is provided as an example. Other examples are possible and may differ from what was described in connection with FIG. 17.

Figure 18:
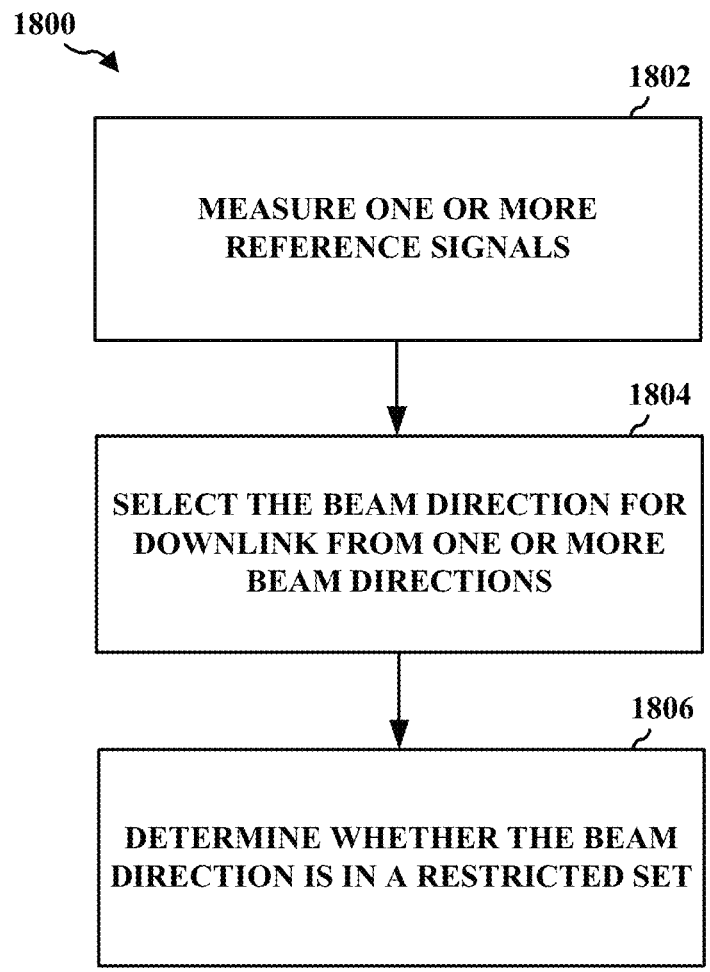
FIG. 18 is a flowchart of a method of wireless communication in accordance with the systems and methods described herein.

FIG. 18 is a flowchart 1800 of a method of wireless communication in accordance with the systems and methods described herein. The method may be performed by a UE 104, 350, 404. At block 1802, the UE measures one or more reference signals (RS) associated with a beam direction from a base station. For example, the UE (e.g., UE 104, 350, 404) measures one or more reference signals (RS) associated with a beam direction from a base station. The UE measures one or more reference signals (RS) associated with a beam direction from a base station by directing a measurement component to perform a measurement and/or the UE may read the measurement. The measurement component may be within the UE, e.g., part of a determination module.

At block 1804, the UE selects the beam direction for downlink transmissions from one or more beam directions based on the measuring. For example, the UE (e.g., UE 104, 350, 404) selects the beam direction for downlink from one or more beam directions based on the measuring. The UE selects the beam direction for downlink from one or more beam directions based on the measuring by reviewing the results of the measurement and making a determination based on the results of the measurement.

At block 1806, the UE determines whether the beam direction is in a restricted set, wherein the restricted set identifies beam direction restricted for an uplink transmissions. For example, the UE (e.g., UE 104, 350, 404) determines whether the beam direction is in a restricted set, wherein the restricted set identifies beam direction restricted for an uplink transmissions. The UE may determine whether the beam direction is in a restricted set by reviewing a list of beam directions in the restricted set and making a determination based on the review of the list of beam directions in the restricted set. In an aspect, the restricted-beam set may be updated based on configuration sent by an base station to declare if a beam-pair needs to be added/removed from restricted beam set.

In an aspect, the UE may transmit a measurement report when the beam direction cannot be used for the uplink transmission, the report including at least one of beam identification, beam signal quality, or restriction information. Restriction information may include directions along NB beam-identity and transmission power limitation along NB beams-identity.

In an aspect, the UE may transmit a measurement report to the base station based on the one or more RS associated with the beam direction.

In an aspect, the UE may receive an RS configuration from the base station to transmit RS in a beam direction associated with the base station. The beam direction for transmission on UL may be quasi-collocated with a DL beam or DL RS.

In an aspect, the beam direction may be in the restricted set.

In an aspect, the UE may receive a configuration from the base station to report to the base station when the restriction set should be changed based on the RS measurements.

Figure 19:
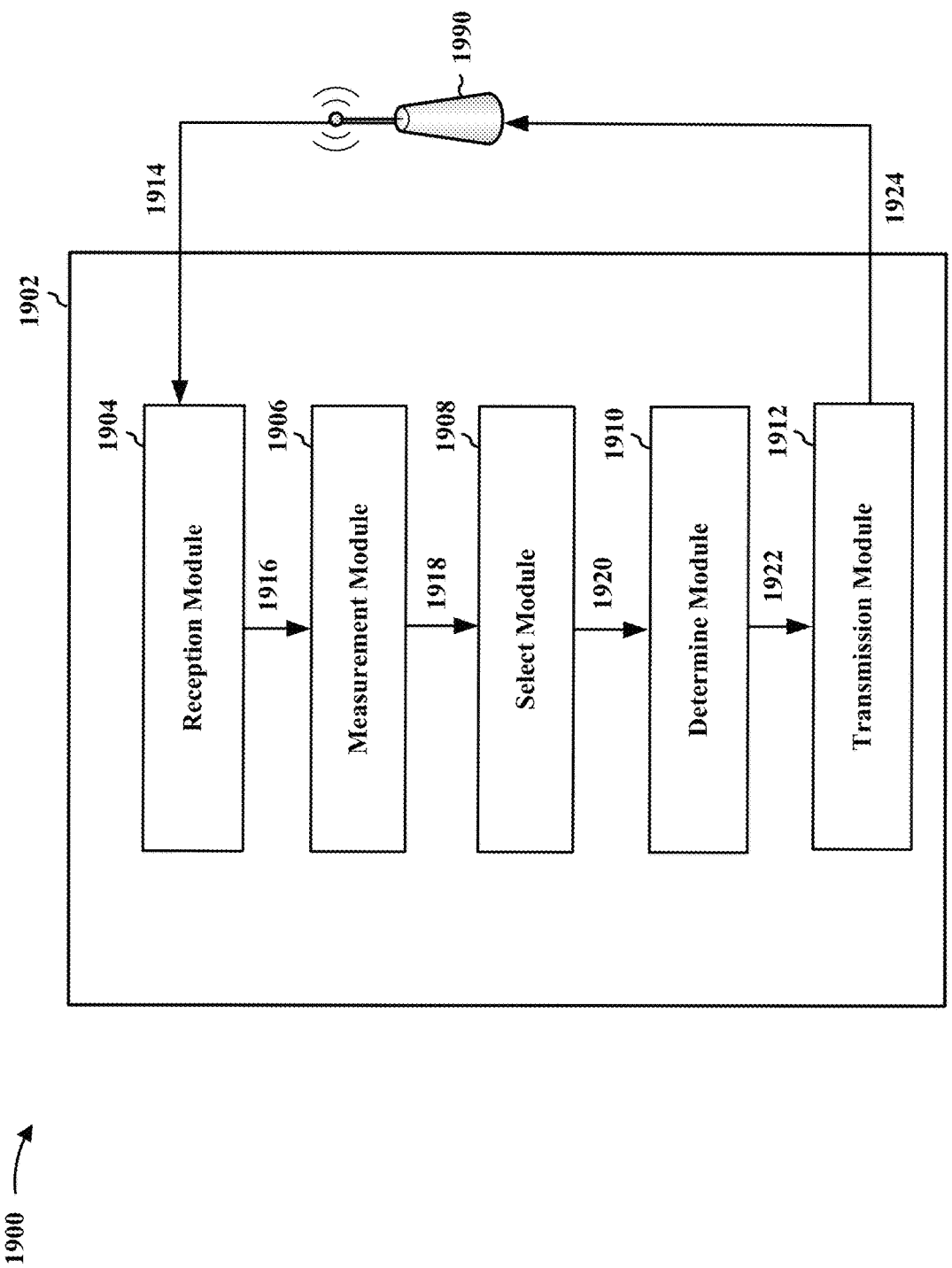
FIG. 19 is a conceptual data flow diagram illustrating the data flow between different modules/means/components in another example apparatus.

FIG. 19 is a conceptual data flow diagram 1900 illustrating the data flow between different modules/means/components in an example apparatus 1902. The apparatus 1902 may be a base station (e.g., base station 610 of FIG. 1). In some aspects, the apparatus 1902 includes a reception module 1904, a measurement module 1906, a selection module 1908, a determine module 1910, and/or a transmission module 1912.

The reception module 1904 may receive one or more reference signals 1914 from a base station 1990 or other wireless communication device. In some aspects, the reception module 1904 may provide one or more of the reference signals 1916 to the measurement module 1906. The measurement module 1906 may measure one or more of the reference signals 1916. For example, measuring may include RSRP, RSRQ, RSSI, and/or SINR.

The measurement module 1906 may provide measurement data 1918 to the select module 1908. In some aspects, the select module 1908 may select a beam direction for downlink from one or more beam directions.

The measurement module 1908 may provide data 1918 to the determine module 1910. For example, the select module 1908 may provide data 1920 to determine module 1910. The determine module 1910 may determine whether the beam direction is in a restricted set. Accordingly, the transmission module may transmit data 1924 in a beam direction based on the determination 1922 from the determination module 1910.

The apparatus may include additional modules that perform each of the blocks of the algorithm in the aforementioned flow chart of FIG. 18. As such, each block in the aforementioned flow chart of FIG. 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 19 are provided as an example. In practice, there may be additional modules, fewer modules, different modules, or differently arranged modules than those shown in FIG. 19. Furthermore, two or more modules shown in FIG. 19 may be implemented within a single module, or a single module shown in FIG. 19 may be implemented as multiple, distributed modules. Additionally, or alternatively, a set of modules (e.g., one or more modules) shown in FIG. 19 may perform one or more functions described as being performed by another set of modules shown in FIG. 19.

Figure 20:
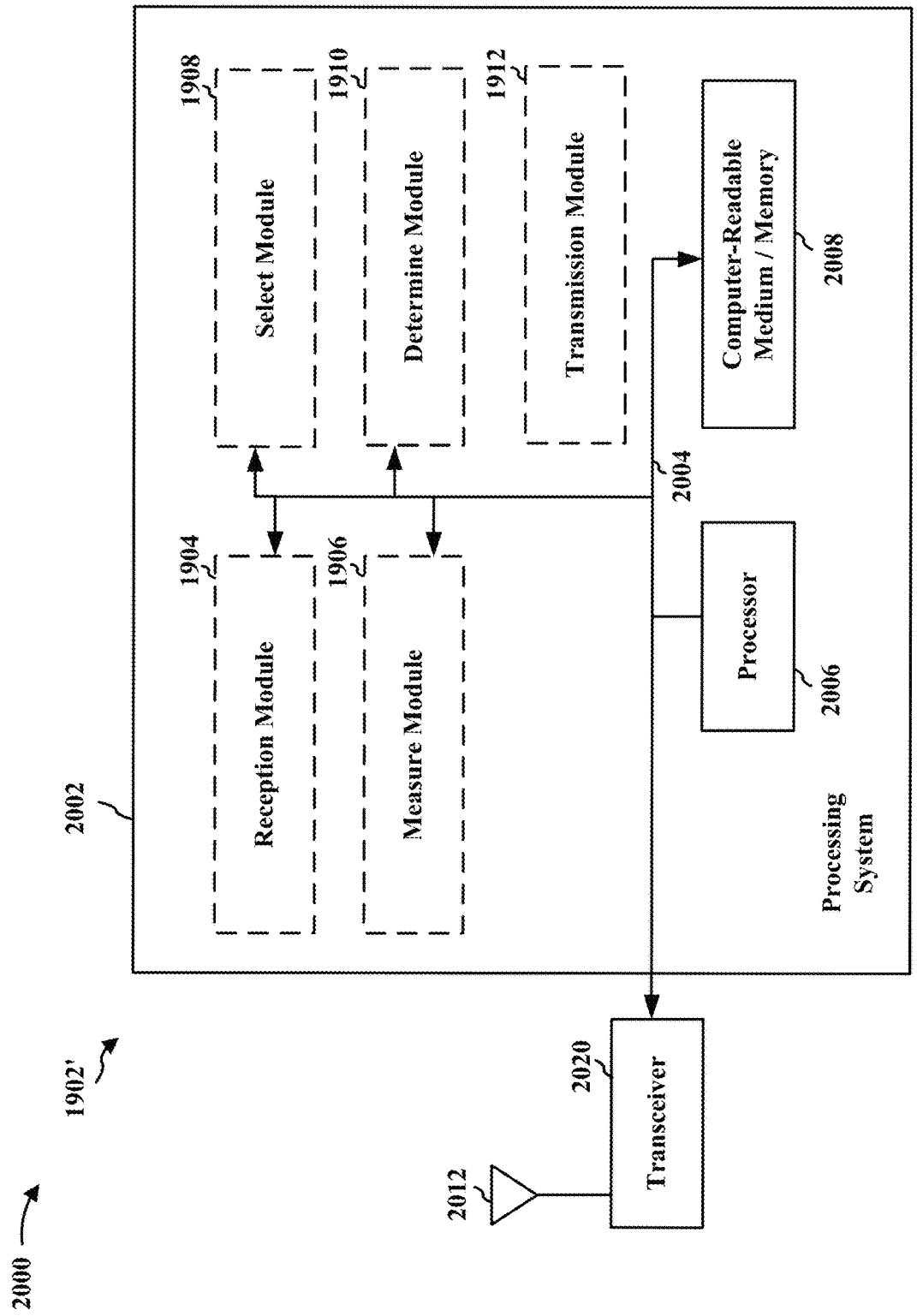
FIG. 20 is a diagram illustrating an example of a hardware implementation for the other apparatus employing a processing system.

FIG. 20 is a diagram 2000 illustrating an example of a hardware implementation for an apparatus 1902' employing a processing system 2002. The apparatus 1902' may be a base station (e.g., base station 610 of FIG. 1).

The processing system 2002 may be implemented with a bus architecture, represented generally by the bus 2004. The bus 2004 may include any number of interconnecting buses and bridges depending on the specific application of the processing system 2002 and the overall design constraints. The bus 2004 links together various circuits including one or more processors and/or hardware modules, represented by the processor 2006, the modules 1904, 1906, 1908, 1910, 1912 and the computer-readable medium/memory 2008. The bus 2004 may also link various other circuits such as timing sources, peripherals, voltage regulators, and power management circuits, which are well known in the art, and therefore, will not be described any further.

The processing system 2002 may be coupled to a transceiver 2010. The transceiver 2010 is coupled to one or more antennas 2012. The transceiver 2010 provides a means for communicating with various other apparatus over a transmission medium. The transceiver 2010 receives a signal from the one or more antennas 2012, extracts information from the received signal, and provides the extracted information to the processing system 2002, specifically the reception module 1904. In addition, the transceiver 2010 receives information from the processing system 2002, specifically the transmission module 1912, and based at least in part on the received information, generates a signal to be applied to the one or more antennas 2012. The processing system 2002 includes a processor 2006 coupled to a computer-readable medium/memory 2008. The processor 2006 is responsible for general processing, including the execution of software stored on the computer-readable medium/memory 2008. The software, when executed by the processor 2006, causes the processing system 2002 to perform the various functions described supra for any particular apparatus. The computer-readable medium/memory 2008 may also be used for storing data that is manipulated by the processor 2006 when executing software. The processing system further includes at least one of the modules 1904, 1906, 1908, 1910, and 1912. The modules may be software modules running in the processor 2006, resident/stored in the computer-readable medium/memory 2008, one or more hardware modules coupled to the processor 2006, or some combination thereof. The processing system 2002 may be a component of the base station 610 and may include the memory 376 and/or at least one of the TX processor 368, the RX processor 370, and/or the controller/processor 375.

In some aspects, the apparatus 1902/1902' for wireless communication includes means for measuring one or more reference signals; means for selecting the beam direction for downlink from one or more beam directions; and means for determining whether the beam direction is in a restricted set. The aforementioned means may be one or more of the aforementioned modules of the apparatus 1902 and/or the processing system 2002 of the apparatus 1902' configured to perform the functions recited by the aforementioned means. As described supra, the processing system 2002 may include the TX processor 368, the RX processor 370, and/or the controller/processor 375. As such, in one configuration, the aforementioned means may be the TX processor 316, the RX processor 370, and/or the controller/processor 375 configured to perform the functions recited by the aforementioned means.

FIG. 20 is provided as an example. Other examples are possible and may differ from what was described in connection with FIG. 20.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A base station, comprising:
a memory; and
at least one processor coupled to the memory and configured to:
determine, at the base station, a restricted-beam set including at least one beam direction that is restricted for at least one of signal transmission or signal reception based on measurements received at the base station from a wireless device;
restrict at least one of a transmission or a reception of a signal based on the restricted-beam set; and
update the restricted-beam set by adding or removing the at least one beam direction to the restricted-beam set corresponding to the at least one of the signal transmission or the signal reception.

2. The base station of claim 1, wherein the base station further determines the updated restricted-beam set by receiving the restricted-beam set from the wireless device.

3. The base station of claim 1, wherein the wireless device comprises a user equipment (UE).

4. The base station of claim 3, wherein the at least one processor is further configured to determine, at the base station, the restricted-beam set based on measurements at the base station, wherein the measurements at the base station comprise measurements of a reference signal.

5. An apparatus for wireless communication, comprising:
a memory; and
at least one processor coupled to the memory and configured to:
measure one or more reference signals (RS) associated with a beam direction from a base station;
select at least one of the beam direction for downlink transmission from one or more beam directions based on the measured RS for each of the one or more beam directions or a beam direction for uplink reception; and
determine whether the selected beam direction is in a restricted-beam set, wherein the restricted-beam set identifies at least one beam direction restricted for an uplink transmission, the restricted beam set based on measurements received at the apparatus from the base station.

6. The apparatus of claim 5, wherein the at least one processor is further configured to transmit a measurement report when the selected beam direction cannot be used for the uplink transmission, the report including a beam identification and a beam signal quality.

7. The apparatus of claim 5, further comprising transmitting a measurement report to the base station based on the one or more RS associated with the selected beam direction.

8. The apparatus of claim 5, further comprising receiving an RS configuration from the base station to transmit RS in a beam direction associated with the base station.

9. The apparatus of claim 5, wherein the beam direction is in the restricted set.

10. The apparatus of claim 5, further comprising receiving a configuration from the base station to report to the base station when the restricted-beam set should be changed based on the RS measurements.

11. The apparatus of claim 5, further comprising receiving a signal from the base station changing the restricted-beam set.

12. A device for wireless communication, comprising:
a memory; and
one or more processors coupled to the memory, the memory and the one or more processors configured to:
determine that an active beam is in a restricted-beam set, the active beam being associated with a wireless communication between a base station and a user equipment (UE), and the restricted-beam set including one or more beam pairs on which the base station is restricted from at least one of receiving wireless communication or transmitting wireless communications of the wireless communication between the UE and the base station, the restricted-beam set based on measurements received at the device from the base station for wireless communication between the UE and the base station; and trigger, based at least in part on determining that the active beam for the wireless communication between the base station and the UE is in the restricted-beam set, a communication-related action including at least one of:
a handover of the UE to another base station,
a request that the UE change the active beam to another beam, or
a configuration of the UE to perform a reference signal measurement.

13. The device of claim 12, wherein the active beam is determined to be in the restricted-beam set based at least in part on information indicating that the active beam is in the restricted-beam set.

14. The device of claim 12, wherein the active beam is determined to be in the restricted-beam set based at least in part on a measurement performed by the UE.

15. The device of claim 12, wherein the active beam is determined to be in the restricted-beam set based at least in part on a measurement performed by the base station.

16. The device of claim 12, wherein a downlink reference signal measurement is requested based at least in part on the determination that the active beam is in the restricted set,
wherein the communication-related action is triggered based at least in part on the downlink reference signal measurement.

17. The device of claim 12, wherein an uplink reference signal measurement is performed based at least in part on the determination that the active beam is in the restricted set,
wherein the communication-related action is triggered based at least in part on the uplink reference signal measurement.

18. The device of claim 12, wherein the active beam is determined to be uplink limited based at least in part on the determination that the active beam is in the restricted set,
wherein the communication-related action is triggered based at least in part on the determination that the active beam is uplink limited.

19. A device for wireless communication, comprising:
a memory; and
one or more processors coupled to the memory, the memory and the one or more processors configured to:
determine that an active beam is in a restricted-beam set, the active beam being associated with a wireless communication between a user equipment (UE) and a base station, and the restricted-beam set including one or more beams on which the UE is restricted from at least one of a received wireless communication or a transmitted wireless communications of the wireless communication between the UE and the base station, the restricted-beam set based on measurements received at the device from the base station for wireless communication between the UE and the base station; and
perform a communication-related action based at least in part upon determining that the active beam is in the restricted-beam set.

20. The device of claim 19, wherein the active beam is determined to be in the restricted-beam set based at least in part on information indicating that the active beam is in the restricted-beam set.

21. The device of claim 19, wherein the active beam is determined to be in the restricted-beam set based at least in part on a measurement performed by the UE.

22. The device of claim 19, wherein information associated with a signal quality of an uplink transmission is determined based at least in part on the determination that the active beam is in the restricted-beam set,
wherein the communication-related action is performed based at least in part on the information associated with the signal quality of an uplink transmission.

23. The device of claim 22, wherein the information associated with the signal quality of the uplink transmission is determined based at least in part on an amount of transmission power, associated with the uplink transmission, satisfying a threshold.

24. The device of claim 19, wherein the communication-related action includes requesting beam training associated with a particular direction,
wherein the particular direction is specified based at least in part on a synchronization signal beam identifier.

25. The device of claim 19, wherein the communication-related action includes requesting a beam switch to another beam associated with the base station.

26. The device of claim 19, wherein the communication-related action includes performing a beam recovery procedure using another beam that is not included in the restricted-beam set.

27. The device of claim 26, wherein cause information and a measurement report are transmitted to the base station during the beam recovery procedure.

28. The device of claim 27, wherein the cause information identifies a cause for the beam recovery procedure as being associated with the restricted-beam set, and the measurement report being associated with the restricted-beam set.

29. The device of claim 19, wherein the communication-related action includes performing a fast radio link failure and selecting another cell.

30. The device of claim 19, wherein the communication-related action includes performing a forward handover.

* * * * *